US007909008B2

(12) United States Patent
Inoue et al.

(10) Patent No.: US 7,909,008 B2
(45) Date of Patent: Mar. 22, 2011

(54) VARIABLE VALVE TIMING SYSTEM AND METHOD FOR CONTROLLING THE SAME

(75) Inventors: Yasumichi Inoue, Toyota (JP); Masayoshi Hattori, Toyota (JP); Tsukasa Abe, Gotenba (JP); Kenji Yamamoto, Toyokawa (JP)

(73) Assignees: Toyota Jidosha Kabushiki Kaisha, Toyota-shi (JP); Denso Corporation, Kariya (JP)

( * ) Notice: Subject to any disclaimer, the term of this patent is extended or adjusted under 35 U.S.C. 154(b) by 241 days.

(21) Appl. No.: 12/299,780

(22) PCT Filed: Aug. 29, 2007

(86) PCT No.: PCT/IB2007/002481
§ 371 (c)(1),
(2), (4) Date: Nov. 6, 2008

(87) PCT Pub. No.: WO2008/029242
PCT Pub. Date: Mar. 13, 2008

(65) Prior Publication Data
US 2009/0101095 A1   Apr. 23, 2009

(30) Foreign Application Priority Data

Aug. 29, 2006   (JP) ................... 2006-232373

(51) Int. Cl.
F01L 1/34 (2006.01)
(52) U.S. Cl. ............ 123/90.17; 123/90.15; 123/90.31
(58) Field of Classification Search ............... 123/90.15, 123/90.31, 90.17
See application file for complete search history.

(56) References Cited

U.S. PATENT DOCUMENTS

| 6,311,655 | B1 | 11/2001 | Simpson et al. | |
|---|---|---|---|---|
| 2003/0145815 | A1 | 8/2003 | Miyakoshi | |
| 2004/0107928 | A1* | 6/2004 | Asada et al. | 123/90.16 |
| 2005/0081808 | A1 | 4/2005 | Tani et al. | |

(Continued)

FOREIGN PATENT DOCUMENTS

JP   59 113227   6/1984

(Continued)

OTHER PUBLICATIONS

Japanese Office Action issued Sep. 21, 2010 in Japanese Patent Application No. 2006-232373 filed Aug. 29, 2006 with English translation.

*Primary Examiner* — Zelalem Eshete
(74) *Attorney, Agent, or Firm* — Oblon, Spivak, McClelland, Maier & Neustadt, L.L.P.

(57) ABSTRACT

In an intake valve phase control after an engine stop command is issued, a stop-time phase is used as a target value. In the intake valve phase control, when the mode changeover condition is not satisfied, and an electric motor that serves as an actuator is not in a locked-state, the highest-speed mode, in which the amount of electric power supplied to the electric motor is fixed to the maximum value, is selected to reliably change the intake valve phase by a required amount. Then, the intake valve phase comes close to the stop-time phase and the mode changeover condition is satisfied, the control mode is changed from the highest-speed mode to the normal mode to set the control phase to the stop-time phase with higher accuracy, and the feedback control over the intake valve phase is executed.

16 Claims, 14 Drawing Sheets

U.S. PATENT DOCUMENTS

2006/0102125 A1    5/2006   Mashiki
2007/0125332 A1    6/2007   Inoue et al.

FOREIGN PATENT DOCUMENTS

| | | |
|---|---|---|
| JP | 2003 328786 | 11/2003 |
| JP | 2004 156461 | 6/2004 |
| JP | 2004 156508 | 6/2004 |
| JP | 2004 190663 | 7/2004 |
| JP | 2005-233174 A | 9/2005 |
| JP | 2006-144567 A | 6/2006 |
| JP | 2007 154715 | 6/2007 |
| WO | 2007 142322 | 12/2007 |

\* cited by examiner

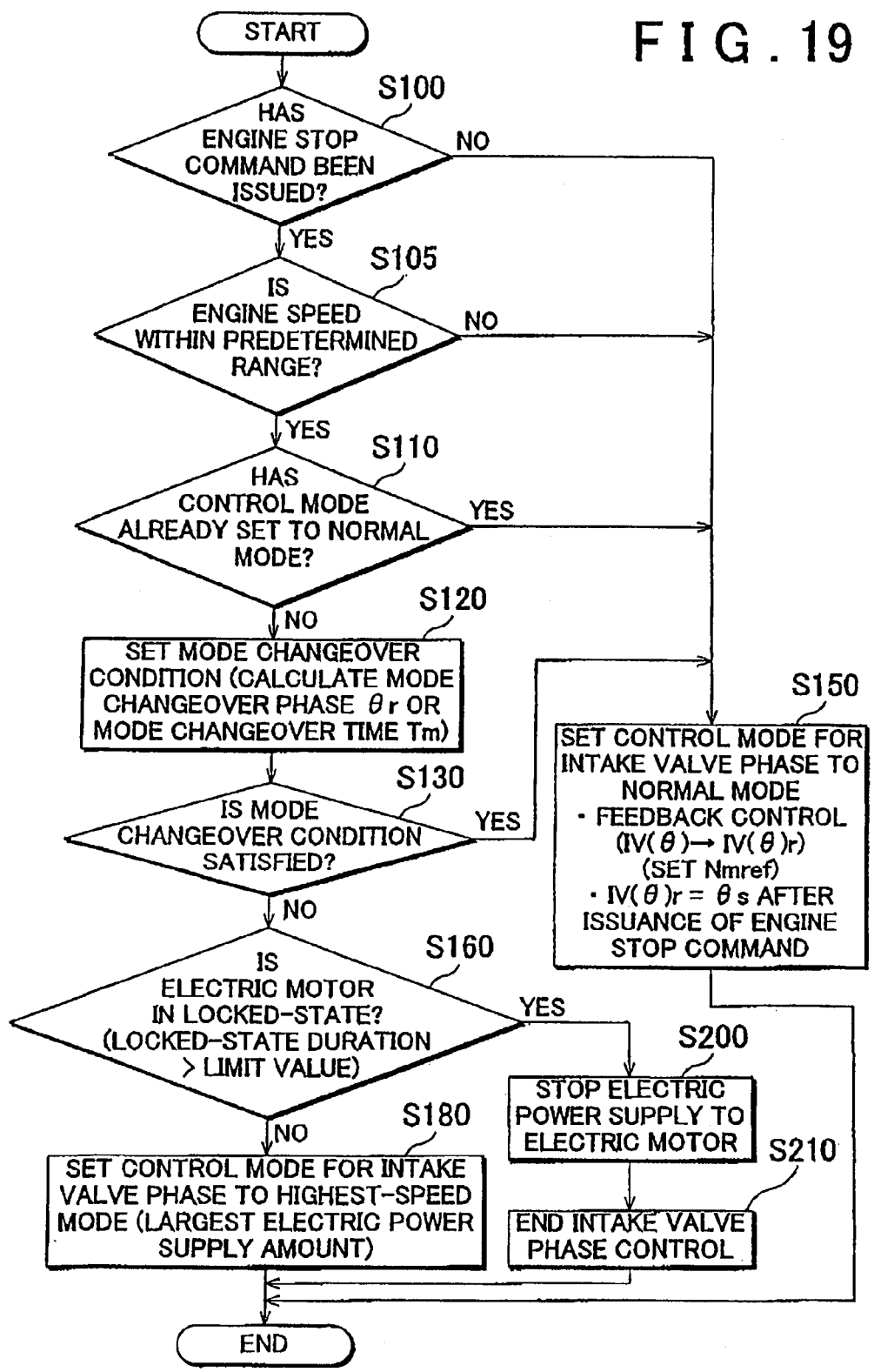

VARIABLE VALVE TIMING SYSTEM AND METHOD FOR CONTROLLING THE SAME

BACKGROUND OF THE INVENTION

1. Field of the Invention

The invention relates generally to a variable valve timing system and a method for controlling the same, and, more specifically, to a variable valve timing system that uses an electric motor as an actuator and a method for controlling the same.

2. Description of the Related Art

A variable valve timing (VVT) system that changes the phase (i.e., crank angle), at which an intake valve or an exhaust valve is opened/closed, based on the engine operating state has been used. Such variable valve timing system changes the phase of the intake valve or the exhaust valve by rotating a camshaft, which opens/closes the intake valve or the exhaust valve, relative to, for example, a sprocket. The camshaft is rotated hydraulically or by means of an actuator, for example, an electric motor.

With a variable valve timing system that hydraulically drives a camshaft, the variable valve timing control is sometimes not executed as accurately as it should be, in a cold environment or at the time of engine starting. Such inconvenience is caused because the hydraulic pressure used to drive the camshaft is insufficient or the response of the camshaft to the hydraulic control is slow in such occasions. To obviate such inconveniences, a variable valve timing system that drives a camshaft by means of an electric motor has been suggested, as described in, for example, Japanese Patent Application Publication No. JP-2004-156461 (JP-A-2004-156461). With a valve timing system described in JP-A-2004-156461, when the valve timing is changed to a value at or around the limit valve, to which the valve timing is able to be changed, the rate of change in the valve timing is restricted. Thus, the situation where a movable part of a variable phase mechanism collides with a stopper portion at a high speed is avoided.

A variable valve timing system is usually operated during the operation of a vehicle. However, even after a command to stop an engine is issued in response to an operation to turn off an ignition key, the variable valve timing system is sometimes operated to change the valve timing (the phase of a camshaft). More specifically, if the valve timing when a command to stop the engine is issued is not at the phase appropriate for the subsequent engine starting, the variable valve timing system changes the valve timing to facilitate the subsequent engine starting. For example, Japanese Patent Application Publication No. 2004-156508 (JP-A-2004-156508) describes a valve timing control system that changes the valve timing such that a camshaft is placed in an angular position appropriate for the subsequent engine starting. According to JP-A-2004-156508, the valve timing is changed by passing electric current through a hysteresis brake, which is an electromagnetically-controlled actuator, during a predetermined period after an ignition key is turned off.

With the valve timing control system described in JP-A-2004-156508, the valve timing control is executed such that the valve timing is changed to the valve timing appropriate for the subsequent engine starting. The valve timing is changed by passing electric current through the hysteresis brake during the predetermined period that starts when the ignition key is turned off. JP-A-2004-156508 describes that the valve timing control similar to that executed during the operation of an engine is continuously executed even after the ignition key is turned off. However, JP-A-2004-156508 has no description concerning a method for reliably changing the valve timing by a required amount by the time the engine is stopped (after the ignition key is turned off) in order to reliably causing the valve timing to match the target value when the engine is stopped (namely, at the subsequent engine starting time). Neither JP-A-2004-156461 nor JP-A-2003-328786 describes a method for reliably changing the valve timing by a required amount by the time the engine is stopped by executing the valve timing control in order to reliably cause the valve timing to match the target value when the engine is stopped.

SUMMARY OF THE INVENTION

The invention provides a variable valve timing system that reliably changes the valve timing by a required amount after an engine stop command is issued, and that accurately sets the valve timing when the engine is stopped to the valve timing at the target phase, and a method for controlling the same.

A first aspect of the invention relates to a variable valve timing system that changes the opening/closing timing of at least one of an intake valve and an exhaust valve provided in an engine, and that includes a changing mechanism and a stop-time phase control unit. The changing mechanism is structured to change the opening/closing timing by changing the rotational phase difference between a camshaft that drives the valve of which the opening closing timing is changed and a crankshaft in a direction, which is determined based on whether the rotational speed of an electric motor, used as an actuator, relative to the rotational speed of the camshaft takes a positive value or a negative value, and at a rate that is determined based on the degree of the rotational speed of the electric motor relative to the rotational speed of the camshaft, when the engine is operating. The stop-time phase control unit sets the control mode for the opening/closing timing after a command to stop the engine is issued. The stop-time phase control unit includes a mode changeover condition setting unit that sets the mode changeover condition based on the rotational speed of the electric motor, and a mode changeover determination unit that determines whether the mode changeover condition is satisfied based on the status of control over the opening/closing timing. The mode changeover determination unit sets the control mode to the first mode in which the electric motor is rotated at the highest possible speed in the current operating state and in the direction in which the opening/closing timing is changed toward the target opening/closing timing, which should be achieved when the engine is stopped, after the command to stop the engine is issued until the mode changeover condition is satisfied, and the mode changeover determination unit sets the control mode to the second mode in which the feedback control for setting the rotational speed command for the electric motor based on the deviation of the current opening/closing timing from the target opening/closing timing is executed, after the mode changeover condition is satisfied.

With the variable valve timing system according to the first aspect of the invention, the opening/closing timing (hereinafter, sometimes referred to as the "valve timing") is reliably changed by a required amount by executing the valve timing control after the engine stop command is issued in the first mode to rotate the electric motor at the highest speed. Also, the valve timing is set to the target valve timing when the engine is stopped by changing the control mode from the first mode to the second mode and executing the feedback control when the valve timing comes close to the target valve timing. As a result, the valve timing when the engine is stopped is reliably set to the target valve timing.

In the first aspect of the invention, the mode changeover determination unit may determine that the mode changeover condition is satisfied when the deviation of the current opening/closing timing from the target opening/closing timing when the engine is stopped is equal to or smaller than a predetermined amount that is variably set based on the current rotational speed of the electric motor. The predetermined amount may be set to a larger value as the rotational speed of the electric motor becomes higher.

In the first aspect of the invention, the mode changeover determination unit may determine that the mode changeover condition is satisfied when the time that has elapsed since the first mode is started is equal to or longer than a predetermined time. The predetermined time may be set based on the deviation of the current opening/closing timing, when the command to stop the engine is issued, from the target opening/closing timing and the current rotational speed of the electric motor such that the predetermined time is set to a shorter value as the rotational speed of the electric motor becomes higher and the deviation of the opening/closing timing, when the command to stop the engine is issued, from the target opening/closing timing becomes smaller.

Thus, as the rotational speed of the electric motor becomes higher, the control mode is changed from the first mode to the second mode at an earlier timing, namely, when the deviation of the current valve timing and the target valve timing is larger. As a result, the valve timing when the engine is stopped is set to the target valve timing with higher accuracy. Especially, when the target valve timing that should be achieved when the engine is stopped is at the most delayed phase, it is possible to prevent devices from malfunctioning due to a high-speed collision of a movable part of the changing mechanism with a stopper portion.

In the first aspect of the invention, the variable valve timing system may further include a locked-state determination unit that determines whether the electric motor is in the locked state in which rotation of the electric motor is stopped substantially completely, based on the rotational speed of the electric motor. The locked-state determination unit may command to stop the electric power supply to the electric motor when the duration during which the electric motor is in the locked-state exceeds a predetermined duration after the command to stop the engine is issued.

Thus, it is possible to avoid the situation in which the electric motor is in the locked-state and therefore overheats. As a result, the devices of the electric motor are protected from malfunctioning.

In the first aspect of the invention, the variable valve timing system may further include a drive control unit that controls the amount of electric power supplied to the electric motor according to a control command concerning the opening/closing timing. The drive control unit may fix the amount of electric power supplied to the electric motor to the maximum value when in the first mode, and the drive control unit may variably control the amount of electric power supplied to the electric motor based on the current rotational speed of the electric motor and the rotational speed command when in the second mode.

Thus, the rotational speed of the electric motor in the first mode is easily and reliably set to the highest possible speed in the current operating state, and therefore the valve timing is reliably changed by a required amount. In the second mode, the feedback control is executed over the valve timing by controlling the rotational speed of the electric motor. As a result, the valve timing is set to the target valve timing with higher accuracy.

In the first aspect of the invention, the changing mechanism may set the ratio of the amount of change in the opening/closing timing with respect to the operation amount of the actuator to a lower value when the opening/closing timing is within the first phase region than when the opening/closing timing is within the second phase region. The target opening/closing timing when the engine is stopped may be set within the first phase region, and the target opening/closing timing when the engine is idling may be set within the second phase region.

Thus, it is possible to bring the valve timing into the first phase region in which the ratio of the amount of change in the phase with respect to the operation amount of the electric motor is low (namely, the speed reduction ratio is high) in accordance with the operation of the electric motor (actuator) from when the engine stop command is issued until when the engine is stopped. Accordingly, it is possible to avoid the situation where the engine is stopped while the valve timing is outside the first phase region, and therefore, an undesirable change in the valve timing is caused due to a rotation of the electric motor by, for example, a reaction force from the camshaft.

In the first aspect of the invention, the target opening/closing timing when the engine is stopped may be the opening/closing timing at the most delayed phase.

Thus, when the target valve timing when the engine is stopped is set to the valve timing at the most delayed phase in order to execute the engine start time pressure reduction control appropriately, the valve timing is reliably changed by a required amount after the engine stop command is issued and the situation, where the movable part of the changing mechanism collides with the stopper portion at a high speed, is avoided.

A second aspect of the invention relates to a method for controlling a variable valve timing system that changes the opening/closing timing of at least one of an intake valve and an exhaust valve provided in an engine, and that includes a changing mechanism that is structured to change the opening/closing timing by changing the rotational phase difference between a camshaft that drives the valve of which the opening closing timing is changed and a crankshaft in a direction, which is determined based on whether the rotational speed of an electric motor, used as an actuator, relative to the rotational speed of the camshaft takes a positive value or a negative value, and at a rate that is determined based on the degree of the rotational speed of the electric motor relative to the rotational speed of the camshaft, when the engine is operating. According to the method, the mode changeover condition is set based on the rotational speed of the electric motor, and whether the mode changeover condition is satisfied is determined based on the status of control over the opening/closing timing. After the command to stop the engine is issued and until the mode changeover condition is satisfied, the control mode is set to the first mode in which the electric motor is rotated at the highest possible speed in the current operating state and in the direction in which the opening/closing timing is changed toward the target opening/closing timing that should be achieved when the engine is stopped. After the mode changeover condition is satisfied, the control mode is set to the second mode in which the feedback control for setting a rotational speed command for the electric motor based on the deviation of the current opening/closing timing from the target opening/closing timing is executed.

With the variable valve timing system and the method for controlling the same according to the aspects of the invention described above, it is possible to reliably change the valve timing by a required amount after an engine stop command is issued, and to accurately set the valve timing when the engine is stopped to the valve timing at the target phase.

BRIEF DESCRIPTION OF THE DRAWINGS

The foregoing and further objects, features and advantages of the invention will become apparent from the following description of an embodiment with reference to the accompanying drawings, wherein the same or corresponding portions will be denoted by the same reference numerals and wherein:

FIG. 19 is a flowchart illustrating the manner in which the control mode is set after a command to stop the engine is issued in the variable valve timing system according to the embodiment of the invention.

DETAILED DESCRIPTION OF THE EMBODIMENT

Figure 1:
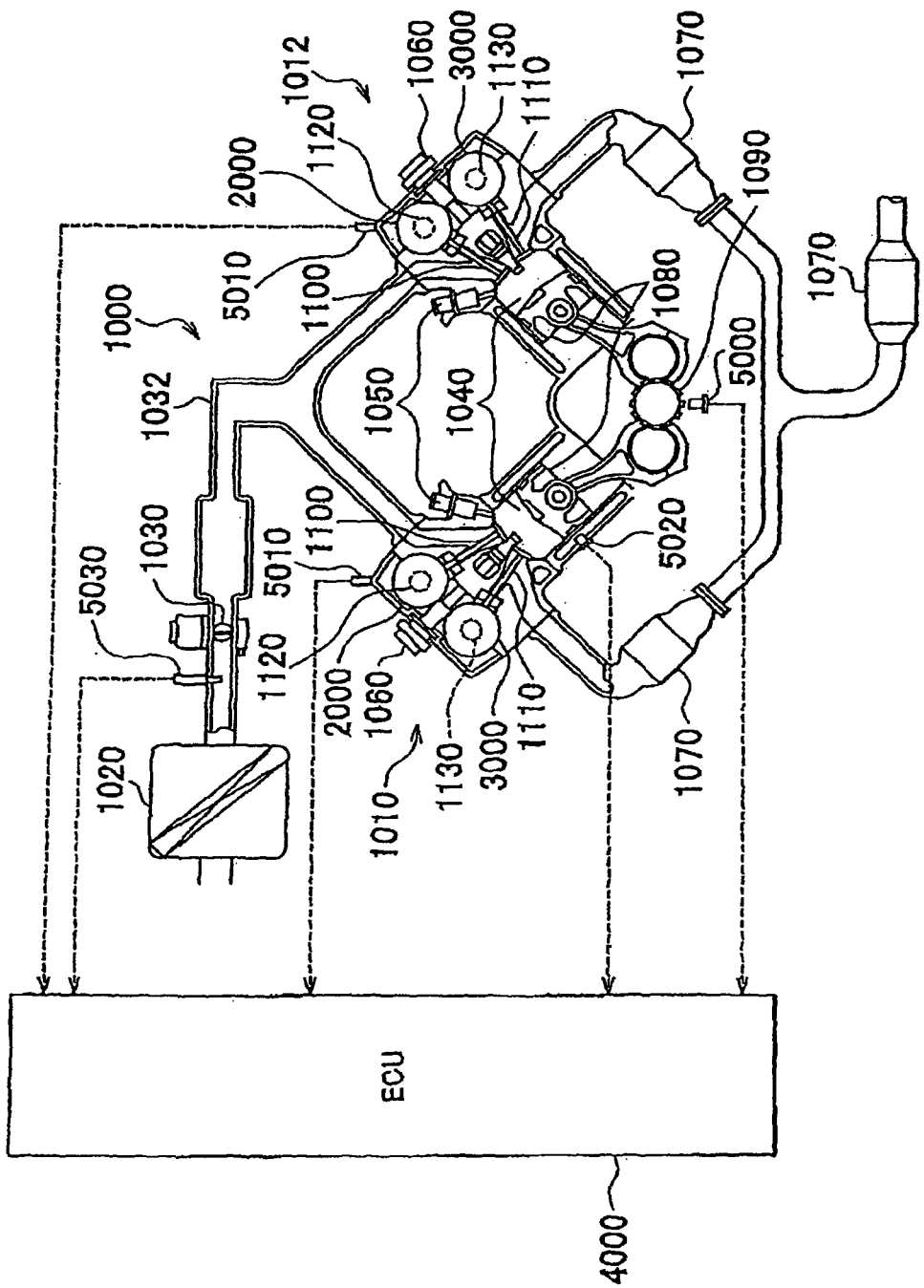
FIG. 1 is a view schematically showing the structure of a vehicle engine provided with a variable valve timing system according to an embodiment of the invention.

Hereafter, an embodiment of the invention will be described with reference to the accompanying drawings. In the following description, the same or corresponding elements will be denoted by the same reference numerals. The names and functions of the elements having the same reference numerals are also the same. Accordingly, the descriptions concerning the elements having the same reference numerals will be provided only once below.

First, a vehicle engine provided with a variable valve timing system according to the embodiment of the invention will be described with reference to FIG. 1.

An engine 1000 is an eight-cylinder V-type engine including a first bank 1010 and a second bank 1012 each of which has four cylinders therein. Note that, the variable valve timing system according to the embodiment of the invention may be applied to any types of engines. Namely, the variable valve timing system may be applied to engines other than an eight-cylinder V-type engine.

Air that has passed through an air cleaner 1020 is supplied to the engine 1000. A throttle valve 1030 adjusts the amount of air supplied to the engine 1000. The throttle valve 1030 is an electronically-controlled throttle valve that is driven by a motor.

The air is introduced into a cylinder 1040 through an intake passage 1032. The air is then mixed with fuel in a combustion chamber formed within the cylinder 1040. The fuel is injected from an injector 1050 directly into the cylinder 1040. Namely, the injection hole of the injector 1050 is positioned within the cylinder 1040.

The fuel is injected into the cylinder 1040 in the intake stroke. The time at which the fuel is injected need not be in the intake stroke. The description concerning the embodiment of the invention will be provided on the assumption that the engine 1000 is a direct-injection engine where the injection hole of the injector 1050 is positioned within the cylinder 1040. In addition to the injector 1050 for direct-injection, an injector for port-injection may be provided. Alternatively, only an injector for port-injection may be provided.

The air-fuel mixture in the cylinder 1040 is ignited by a spark plug 1060, and then burned. The burned air-fuel mixture, namely, the exhaust gas is purified by a three-way catalyst 1070, and then discharged to the outside of the vehicle. A piston 1080 is pushed down due to combustion of the air-fuel mixture, whereby a crankshaft 1090 is rotated.

An intake valve 1100 and an exhaust valve 1110 are provided on the top of the cylinder 1040. The intake valve 1100 is driven by an intake camshaft 1120, and the exhaust valve 1110 is driven by an exhaust camshaft 1130. The intake camshaft 1120 and the exhaust camshaft 1130 are connected to each other by, for example, a chain or a gear, and rotate at the same number of revolutions (at one-half the number of revolutions of the crankshaft 1090). Because the number of revolutions (typically, the number of revolutions per minute (rpm)) of a rotating body, for example, a shaft is usually referred to as the rotational speed, the term "rotational speed" will be used in the following description.

The phase (opening/closing timing) of the intake valve 1100 is controlled by an intake VVT mechanism 2000 which is fitted to the intake camshaft 1120. The phase (opening/closing timing) of the exhaust valve 1110 is controlled by an exhaust VVT mechanism 3000 which is fitted to the exhaust camshaft 1130.

In the embodiment of the invention, the intake camshaft 1120 and the exhaust camshaft 1130 are rotated by the VVT mechanisms 2000 and 3000, respectively, whereby the phase of the intake valve 1100 and the phase of the exhaust valve 1110 are controlled. However, the method for controlling the phase is not limited to this.

Figure 3:
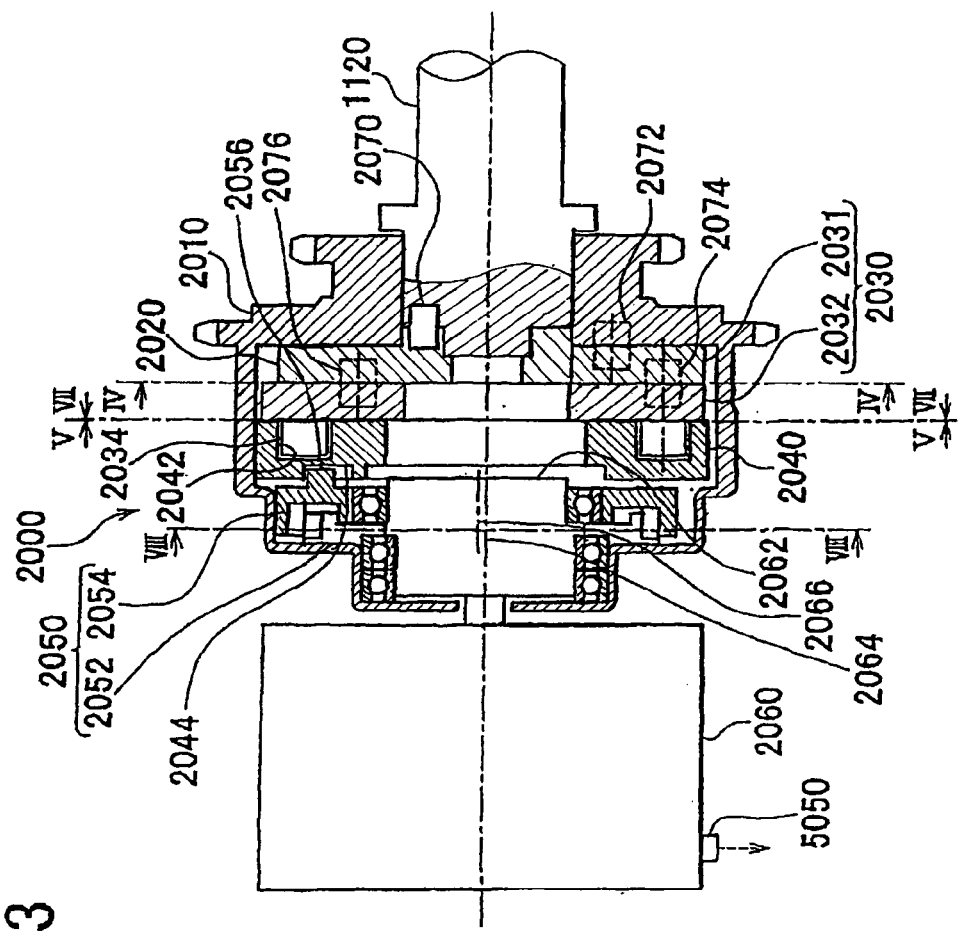
FIG. 3 is a cross-sectional view showing an intake VVT mechanism.

The intake VVT mechanism 2000 is operated by an electric motor 2060 (shown in FIG. 3). The electric motor 2060 is controlled by an electronic control unit (ECU) 4000. The magnitude of electric current passing through the electric motor 2060 is detected by an ammeter (not shown) and the voltage applied to the electric motor 2060 is detected by a voltmeter (not shown), and a signal indicating the magnitude of electric current and a signal indicating the voltage are transmitted to the ECU 4000. The exhaust VVT mechanism 3000 is hydraulically operated. Note that, the intake VVT mechanism 2000 may be hydraulically operated. Note that, the exhaust VVT mechanism 3000 may be operated by means of an electric motor.

The ECU 4000 receives signals indicating the rotational speed and the crank angle of the crankshaft 1090, from a crank angle sensor 5000. The ECU 4000 also receives a signal indicating the phase of the intake camshaft 1120 and a signal indicating the phase of the exhaust camshaft 1130 (the positions of these camshafts in the rotational direction), from a camshaft position sensor 5010.

In addition, the ECU 4000 receives a signal indicating the temperature of a coolant for the engine 1000 (the coolant temperature) from a coolant temperature sensor 5020, and a signal, indicating the amount of air supplied to the engine 1000, from an airflow meter 5030.

The ECU 4000 controls the throttle valve opening amount, the ignition timing, the fuel injection timing, the fuel injection amount, the phase of the intake valve 1100, the phase of the exhaust valve 1110, etc. based on the signals received from the above-mentioned sensors and the maps and programs stored in memory (not shown) so that the engine 1000 is brought into the desired operating state.

According to the embodiment of the invention, the ECU 4000 successively sets the target phase of the intake valve 1100 appropriate for the current engine operating state with reference to the map that defines the target phase in advance using parameters indicating the engine operating state, typically, using the engine speed NE and the intake air amount KL. Generally, multiple maps, used to set the target phase of the intake valve 1100 at multiple coolant temperatures, are stored.

Hereafter, the intake VVT mechanism 2000 will be described in more detail. Note that, the exhaust VVT mechanism 3000 may have the same structure as the intake WT mechanism 2000 described below. Alternatively, each of the intake WT mechanism 2000 and the exhaust WT mechanism 3000 may have the same structure as the intake VVT mechanism 2000 described below.

As shown in FIG. 3, the intake VVT mechanism 2000 includes a sprocket 2010, a cam plate 2020, link mechanisms 2030, a guide plate 2040, a speed reducer 2050, and the electric motor 2060.

The sprocket 2010 is connected to the crankshaft 1090 via, for example, a chain. The rotational speed of the sprocket 2010 is one-half the rotational speed of the crankshaft 1090, as in the case of the intake camshaft 1120 and the exhaust camshaft 1130. The intake camshaft 1120 is provided such that the intake camshaft 1120 is coaxial with the sprocket 2010 and rotates relative to the sprocket 2010.

The cam plate 2020 is connected to the intake camshaft 1120 with a first pin 2070. In the sprocket 2010, the cam plate 2020 rotates together with the intake camshaft 1120. The cam plate 2020 and the intake camshaft 1120 may be formed integrally with each other.

Figure 4:
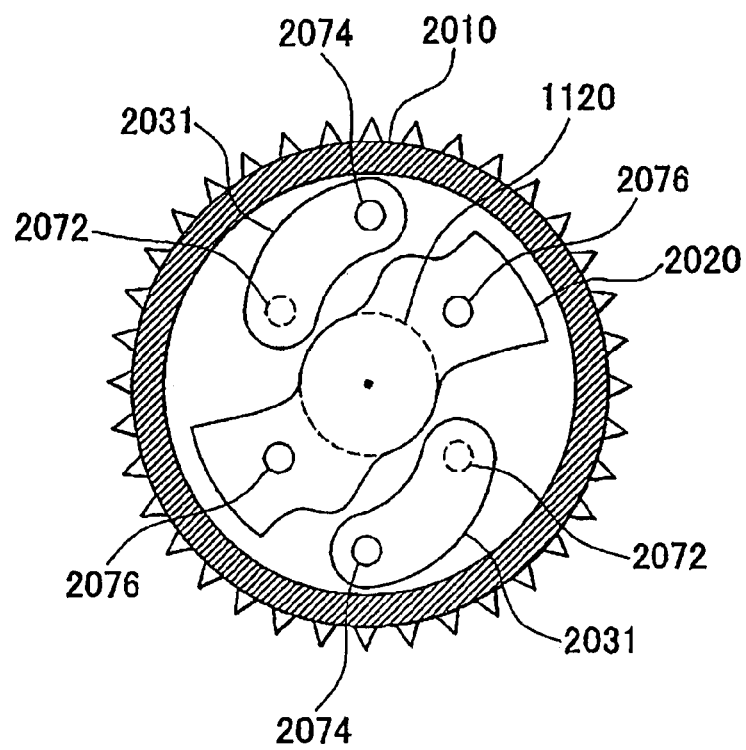
FIG. 4 is a cross-sectional view taken along the line IV-IV in FIG. 3.

Each link mechanism 2030 is formed of a first arm 2031 and a second arm 2032. As shown in FIG. 4, that is, a cross-sectional view taken along the line IV-IV in FIG. 3, paired first arms 2031 are arranged in the sprocket 2010 so as to be symmetric with respect to the axis of the intake camshaft 1120. Each first arm 2031 is connected to the sprocket 2010 so as to pivot about a second pin 2072.

Figure 5:
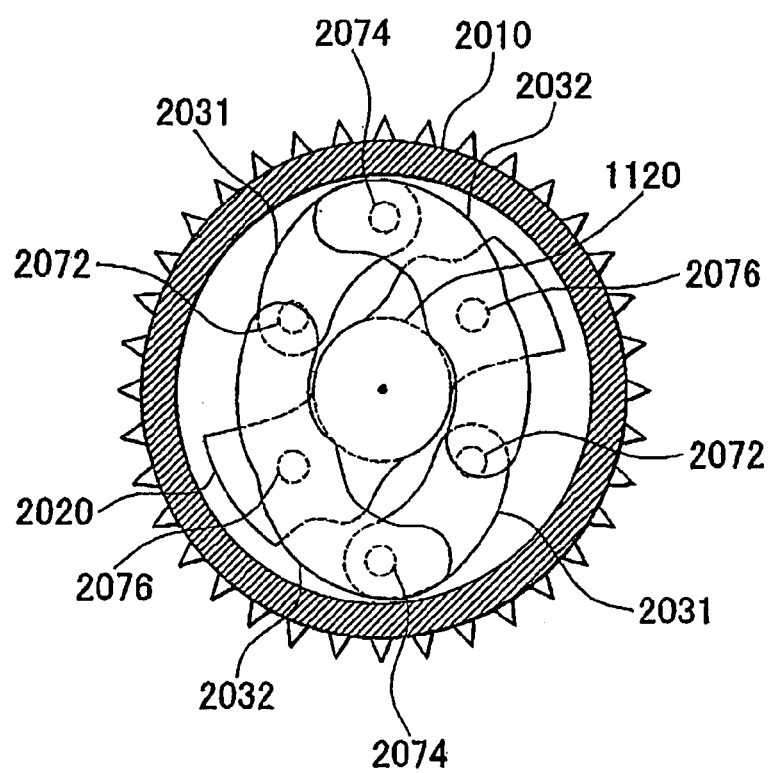
FIG. 5 is a first cross-sectional view taken along the line V-V in FIG. 3.
Figure 6:
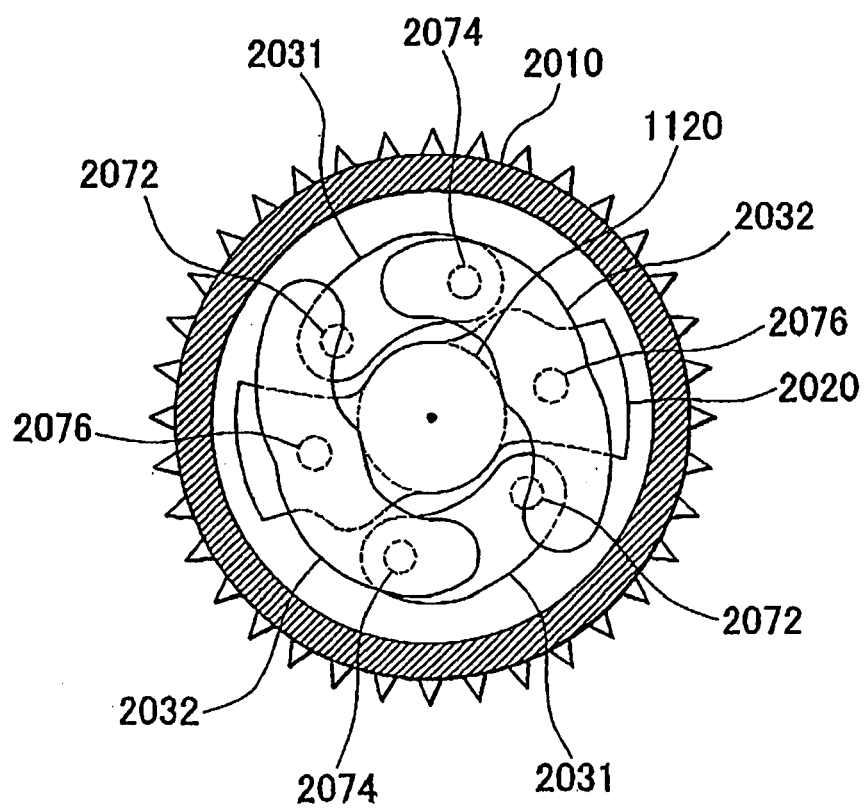
FIG. 6 is a second cross-sectional view taken along the line V-V in FIG. 3.

As shown in FIG. 5, that is, a cross-sectional view taken along the line V-V in FIG. 3, and FIG. 6 that shows the state achieved by advancing the phase of the intake valve 1100 from the state shown in FIG. 5, the first arms 2031 and the cam plate 2020 are connected to each other by the second arms 2032.

Each second arm 2032 is supported so as to pivot about a third pin 2074, with respect to the first arm 2031. Each second arm 2032 is supported so as to pivot about a fourth pin 2076, with respect to the cam plate 2020.

The intake camshaft 1120 is rotated relative to the sprocket 2010 by the pair of link mechanisms 2030, whereby the phase of the intake valve 100 is changed. Accordingly, even if one of the link mechanisms 2030 breaks and snaps, the phase of the intake valve 1100 is changed by the other link mechanism 2030.

As shown in FIG. 3, a control pin 2034 is fitted on one face of each link mechanism 2030 (more specifically, the second arm 2032), the face being proximal to the guide plate 2040. The control pin 2034 is arranged coaxially with the third pin 2074.

Each control pin 2034 slides within a guide groove 2042 formed in the guide plate 2040. Each control pin 2034 moves in the radial direction while sliding within the guide groove 2042 formed in the guide plate 2040. The movement of each control pin 2034 in the radial direction rotates the intake camshaft 1120 relative to the sprocket 2010.

Figure 7:
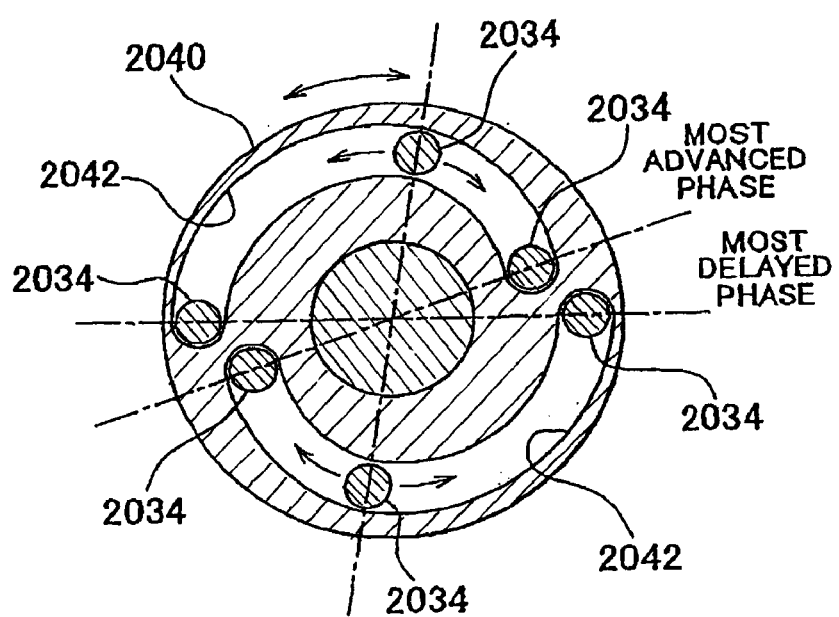
FIG. 7 is a cross-sectional view taken along the line VII-VII in FIG. 3.

As shown in FIG. 7, that is, a cross-sectional view taken along the line VII-VII in FIG. 3, the guide groove 2042 is formed in a spiral fashion such that the control pin 2034 moves in the radial direction in accordance with the rotation of the guide plate 2040. However, the shape of the guide groove 2042 is not limited to this.

As the distance between the control pin 2034 and the axis of the guide plate 2040 increases in the radial direction, the phase of the intake valve 1100 is more delayed. Namely, the amount of change in the phase corresponds to the amount by which each link mechanism 2030 is operated in accordance with the movement of the control pin 2034 in the radial direction. Note that, as the distance between the control pin 2034 and the axis of the guide plate 2040 increases in the radial direction, the phase of the intake valve 1100 may be more advanced.

As shown in FIG. 7, when the control pin 2034 reaches the end of the guide groove 2042, the operation of the link mechanism 2030 is restricted. Accordingly, the phase at which the control pin 2034 reaches the end of the guide groove 2042 is the most advanced phase or the most delayed phase of the intake valve 1100.

As shown in FIG. 3, multiple recesses 2044 are formed in one face of the guide plate 2040, the face being proximal to the speed reducer 2050. The recesses 2044 are used to connect the guide plate 2040 and the speed reducer 2050 to each other.

The speed reducer 2050 is formed of an externally-toothed gear 2052 and an internally-toothed gear 2054. The externally-toothed gear 2052 is fixed to the sprocket 2010 so as to rotate together with the sprocket 2010.

Multiple projections 2056, which are fitted in the recesses 2044 of the guide plate 2040, are formed on the internally-toothed gear 2054. The internally-toothed gear 2054 is supported so as to be rotatable about an eccentric axis 2066 of a coupling 2062 of which the axis deviates from an axis 2064 of the output shaft of the electric motor 2060.

Figure 8:
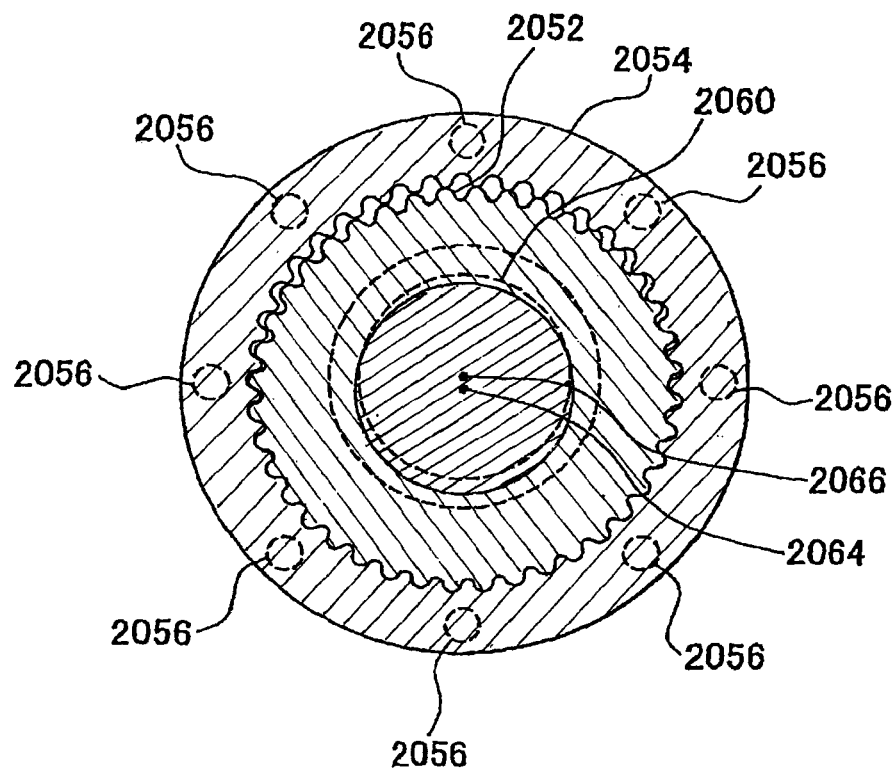
FIG. 8 is a cross-sectional view taken along the line VIII-VIII in FIG. 3.

FIG. 8 shows a cross-sectional view taken along the line VIII-VIII in FIG. 3. The internally-toothed gear 2054 is arranged such that part of the multiple teeth thereof mesh with the externally-toothed gear 2052. When the rotational speed of the output shaft of the electric motor 2060 is equal to the rotational speed of the sprocket 2010, the coupling 2062 and the internally-toothed gear 2054 rotate at the same rotational speed as the externally-toothed gear 2052 (the sprocket 2010). In this case, the guide plate 2040 rotates at the same rotational speed as the sprocket 2010, and the phase of the intake valve 1100 is maintained.

When the coupling 2062 is rotated about the axis 2064 relative to the externally-toothed gear 2052 by the electric motor 2060, the entirety of the internally-toothed gear 2054 turns around the axis 2064, and, at the same time, the internally-toothed gear 2054 rotates about the eccentric axis 2066. The rotational movement of the internally-toothed gear 2054 causes the guide plate 2040 to rotate relative to the sprocket 2010, whereby the phase of the intake valve 1100 is changed.

As can be seen from the structure described above, it is difficult to change the phase of the intake valve 1100 by solely rotating the internally-toothed gear 2054 using the electric motor 2060 when the engine 1000 is stopped, namely, when the rotation of the sprocket 2010 is stopped. That is, it is difficult for the intake VVT mechanism 2000 to change the valve timing after the engine 1000 is stopped.

The phase of the intake valve 1100 is changed by reducing the relative rotational speed (the operation amount of the electric motor 2060) between the output shaft of the electric motor 2060 and the sprocket 2010 using the speed reducer 2050, the guide plate 2040 and the link mechanisms 2030. Alternatively, the phase of the intake valve 1100 may be changed by increasing the relative rotational speed between the output shaft of the electric motor 2060 and the sprocket 2010. The output shaft of the electric motor 2060 is provided with a motor rotational angle sensor 5050 that outputs a signal indicating the rotational angle (the position of the output shaft in its rotational direction) of the output shaft. Generally, the motor rotational angle sensor 5050 produces a pulse signal each time the output shaft of the electric motor 2060 is rotated by a predetermined angle. The rotational speed of the output shaft of the electric motor 2060 (hereinafter, simply referred to as the "rotational speed of the electric motor 2060" or the "motor speed" where appropriate) is detected based on the signal output from the motor rotational angle sensor 5050.

Figure 9:
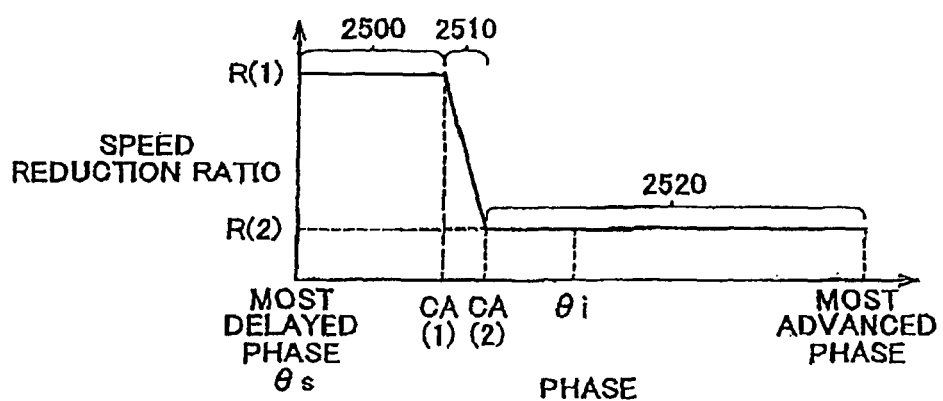
FIG. 9 is a graph showing the speed reduction ratio that the elements of the intake VVT mechanism realize in cooperation.

As shown in FIG. 9, the speed reduction ratio R (θ) that the elements of the intake VVT mechanism 2000 realize in cooperation, namely, the ratio of the relative rotational speed between the output shaft of the electric motor 2060 and the sprocket 2010 to the amount of change in the phase of the intake valve 1100 may take a value corresponding to the phase of the intake valve 1100. According to the embodiment of the invention, as the speed reduction ratio increases, the amount of change in the phase with respect to the relative rotational speed between the output shaft of the electric motor 2060 and the sprocket 2010 decreases.

When the phase of the intake valve 1100 is within a phase region 2500 that extends from the most delayed phase to CA1, the speed reduction ratio that the elements of the intake VVT mechanism 2000 realize in cooperation is R1. When the phase of the intake valve 1100 is within a phase region 2520 that extends from CA2 (CA2 is the phase more advanced than CA1) to the most advanced phase, the speed reduction ratio that the elements of the intake VVT mechanism 2000 realize in cooperation is R2 (R1>R2).

When the phase of the intake valve 1100 is within a phase region 2510 that extends from CA1 to CA2, the speed reduction ratio that the elements of the intake VVT mechanism 2000 realize in cooperation changes at a predetermined rate ((R2−R1)/(CA2−CA1)).

The effects of the thus configured intake VVT mechanism 2000 of the variable valve timing system according to the embodiment of the invention will be described below.

Figure 10:
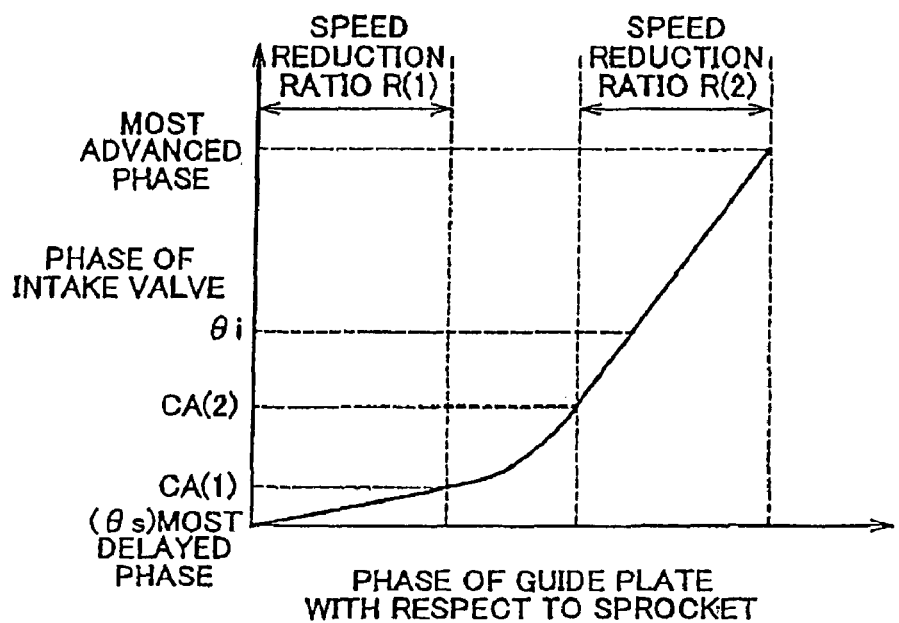
FIG. 10 is a graph showing the relationship between the phase of a guide plate relative to a sprocket and the phase of the intake camshaft.

When the phase of the intake valve 1100 (the intake camshaft 1120) is advanced, the electric motor 2060 is operated to rotate the guide plate 2040 relative to the sprocket 2010. As a result, the phase of the intake valve 1100 is advanced, as shown in FIG. 10.

When the phase of the intake valve 1100 is within the phase region 2500 that extends from the most delayed phase to CA1, the relative rotational speed between the output shaft of the electric motor 2060 and the sprocket 2010 is reduced at the speed reduction ratio R1. As a result, the phase of the intake valve 1100 is advanced.

When the phase of the intake valve 1100 is within the phase region 2520 that extends from CA2 to the most advanced phase, the relative rotational speed between the output shaft of the electric motor 2060 and the sprocket 2010 is reduced at the speed reduction ratio R2. As a result, the phase of the intake valve 1100 is advanced.

When the phase of the intake valve 1100 is delayed, the output shaft of the electric motor 2060 is rotated relative to the sprocket 2010 in the direction opposite to the direction in which the phase of the intake valve 1100 is advanced. When the phase is delayed, the relative rotational speed between the output shaft of the electric motor 2060 and the sprocket 2010 is reduced in the manner similar to that when the phase is advanced. When the phase of the intake valve 1100 is within the phase region 2500 that extends from the most delayed phase to CA1, the relative rotational speed between the output shaft of the electric motor 2060 and the sprocket 2010 is reduced at the speed reduction ratio R1. As a result, the phase is delayed. When the phase of the intake valve 1100 is within the phase region 2520 that extends from CA2 to the most advanced phase, the relative rotational speed between the output shaft of the electric motor 2060 and the sprocket 2010 is reduced at the speed reduction ratio R2. As a result, the phase is delayed.

Accordingly, as long as the direction of the relative rotation between the output shaft of the electric motor 2060 and the sprocket 2010 remains unchanged, the phase of the intake valve 1100 may be advanced or delayed in both the phase region 2500 that extends from the most delayed phase to CA1 and the phase region 2520 that extends from the CA2 to the most advanced phase. In this case, in the phase region 2520 that extends from CA2 to the most advanced phase, the phase is advanced or delayed by an amount larger than that in the phase region 2500 that extends from the most delayed phase to CA1. Accordingly, the phase region 2520 is broader in the phase change width than the phase region 2500.

In the phase region 2500 that extends from the most delayed phase to CA1, the speed reduction ratio is high. Accordingly, a high torque is required to rotate the output shaft of the electric motor 2060 using the torque applied to the intake camshaft 1120 in accordance with the operation of the engine 1000. Therefore, even when the electric motor 2060 does not produce a torque, for example, even when the electric motor 2060 is not operating, the rotation of the output shaft of the electric motor 2060, which is caused by the torque applied to the intake camshaft 1120, is restricted. This restricts an occurrence of an undesirable phase change, that is, the deviation of the actual phase from the phase used in the control.

Preferably, the relationship between the direction in which the electric motor 2060 rotates relative to the sprocket 2010 and the advance/delay of the phase is set such that the phase of the intake valve 1100 is delayed when the output shaft of the electric motor 2060 is lower in rotational speed than the sprocket 2010. Thus, when the electric motor 2060 that serves as the actuator becomes inoperative while the engine is operating, the phase of the intake valve 1100 is gradually delayed, and finally agrees with the most delayed phase. Namely, even if the intake valve phase control becomes inexecutable, the phase of the intake valve 1100 is brought into a state in which combustion stably takes place in the engine 1000.

When the phase of the intake valve 1100 is within the phase region 2510 that extends from CA1 to CA2, the relative rotational speed between the output shaft of the electric motor 2060 and the sprocket 2010 is reduced at the speed reduction ratio that changes at a predetermined rate. As a result, the phase of the intake valve 1100 is advanced or delayed.

When the phase of the intake valve 1100 is shifted from the phase region 2500 to the phase region 2520, or from the phase region 2520 to the phase region 2500, the amount of change in the phase with respect to the relative rotational speed between the output shaft of the electric motor 2060 and the sprocket 2010 is gradually increased or reduced. Accordingly, an abrupt stepwise change in the amount of change in the phase is restricted to restrict an abrupt change in the phase. As a result, the phase of the intake valve 1100 is controlled more appropriately.

The speed reduction ratio $R(\theta)$ in FIG. 9 corresponds to the reciprocal of the ratio of the amount of change in the phase of the intake valve 1100 with respect to the operation amount of the electric motor 2060 (the relative rotational speed between the output shaft of the electric motor 2060 and the sprocket 2010). Namely, the phase region 2500 in which the speed reduction ratio is high may be regarded as a "first phase region" according to the invention, and the other phase regions 2510 and 2520 may be collectively regarded as a "second phase region" according to the invention.

With the variable valve timing system according to the embodiment of the invention, the phase of the intake valve 1100 when the engine 1000 is started (hereinafter, referred to as the "start-time phase" where appropriate) is set within the phase region 2500, shown in FIG. 9, in which the speed reduction ratio is high. Especially, in vehicles in which the engine intermittent operation is automatically performed such as a vehicle provided with an economy running system that automatically stops an engine when the engine starts idling, and a hybrid vehicle that is able to run using only a motor as a drive power source, preferably, the start-time pressure reduction control for setting the start-time phase to the most delayed phase is executed to reduce the vibration when the engine is started.

The following description concerning the embodiment of the invention will be provided on the assumption that the start-time phase is set to the most delayed phase. Accordingly, the target phase (stop-time phase) of the intake valve after a command to stop the engine 1000 (hereinafter, referred to as an "engine stop command") is issued is set to the most delayed phase $\theta s$ to facilitate the subsequent engine starting.

The target phase $\theta i$ of the intake valve 1100, which is used when the engine 1000 is idling, is set to a phase outside the phase region 2500. In this case, it is necessary to reliably change the phase of the intake valve 1000 by a required amount after an engine stop command is issued, in order to reliably bring the phase of the intake valve 1100 back into the region 2500 after the engine stop command is issued. The phase of the intake valve 1100 is brought back into the region 2500 in order to prevent an occurrence of undesirable change in the phase of the intake valve 1100 when the engine 1000 is stopped. In the embodiment of the invention, examples of an engine stop command include an engine stop command issued in response to an operation performed by the driver, typically, an operation to turn off an ignition switch, and an engine stop command that is automatically produced by the engine automatic stop control executed in, for example, a hybrid vehicle or a vehicle provided with an economy running system.

Next, the configuration of the control over the phase of the intake valve 1100 (hereinafter, simply referred to as the "intake valve phase" where appropriate) will be described in detail.

Figure 11:
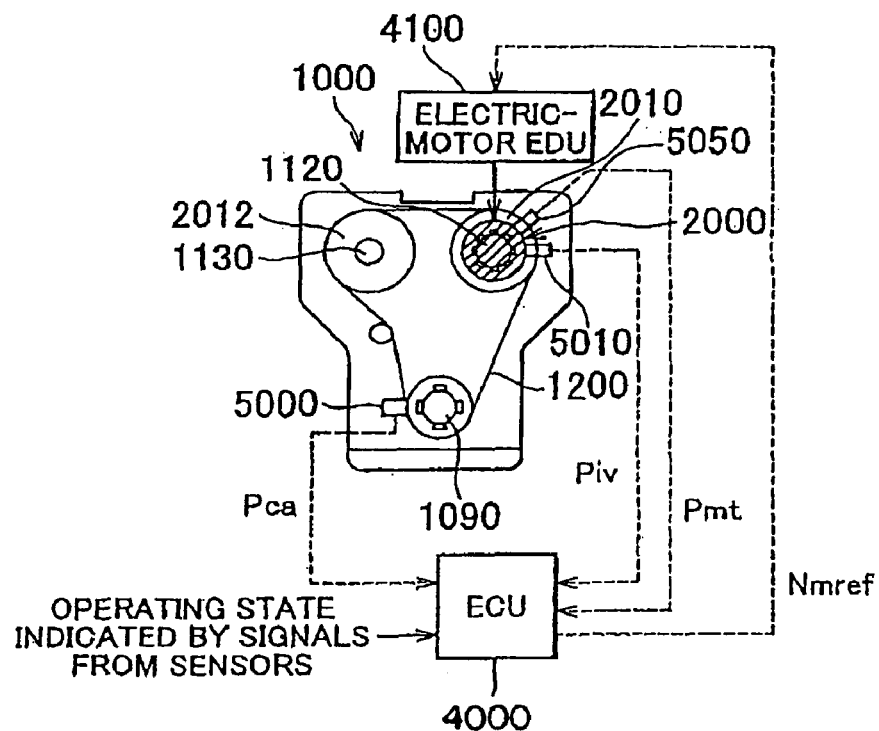
FIG. 11 is a schematic block diagram illustrating the configuration of the control executed by the variable valve timing system over the phase of the intake valve according to the embodiment of the invention.

As shown in FIG. 11, the engine 1000 is configured such that the power is transferred from the crank shaft 1090 to the intake camshaft 1120 and the exhaust camshaft 1130 via the sprocket 2010 and a sprocket 2012, respectively, by a timing chain 1200 (or a timing belt), as previously described with reference to FIG. 1. The camshaft position sensor 5010 that outputs a cam angle signal Piv each time the intake camshaft 1120 rotates by a predetermined cam angle is fitted on the outer periphery of the intake camshaft 1120. The crank angle sensor 5000 that outputs a crank angle signal Pca each time the crankshaft 1090 rotates by a predetermined crank angle is fitted on the outer periphery of the crankshaft 1090. The motor rotational angle sensor 5050 that outputs a motor rotational angle signal Pmt each time the electric motor 2060 rotates by a predetermined rotational angle is fitted to a rotor (not shown) of the electric motor 2060. These cam angle signal Piv, crank angle signal Pca and motor rotational angle signal Pmt are transmitted to the ECU 4000.

The ECU 4000 controls the operation of the engine 1000 based on the signals output from the sensors that detect the operating state of the engine 1000 and the operation conditions (the pedal operations performed by the driver, the current vehicle speed, etc.) such that the engine 1000 produces a required output power. As part of the engine control, the ECU 4000 sets the target value of the phase of the intake valve 1100 and the target value of the phase of the exhaust valve 1110 based on the map shown in FIG. 2. In addition, the ECU 4000 prepares the rotational speed command value Nmref for the electric motor 2060 that serves as the actuator of the intake VVT mechanism 2000. If the electric motor 2060 rotates at the rotational speed command value Nmref, the phase of the intake valve 1100 matches the target value (target phase).

The rotational speed command value Nmref is set based on the relative rotational speed between the output shaft of the electric motor 2060 and the sprocket 2010 (the intake camshaft 1120), which corresponds to the operation amount of the actuator, as described in detail below. An electric-motor EDU (Electronic Drive Unit) 4100 controls the rotational speed of the electric motor 2060 based on the rotational speed command value Nmref indicated by a signal from the ECU 4000.

Figure 12:
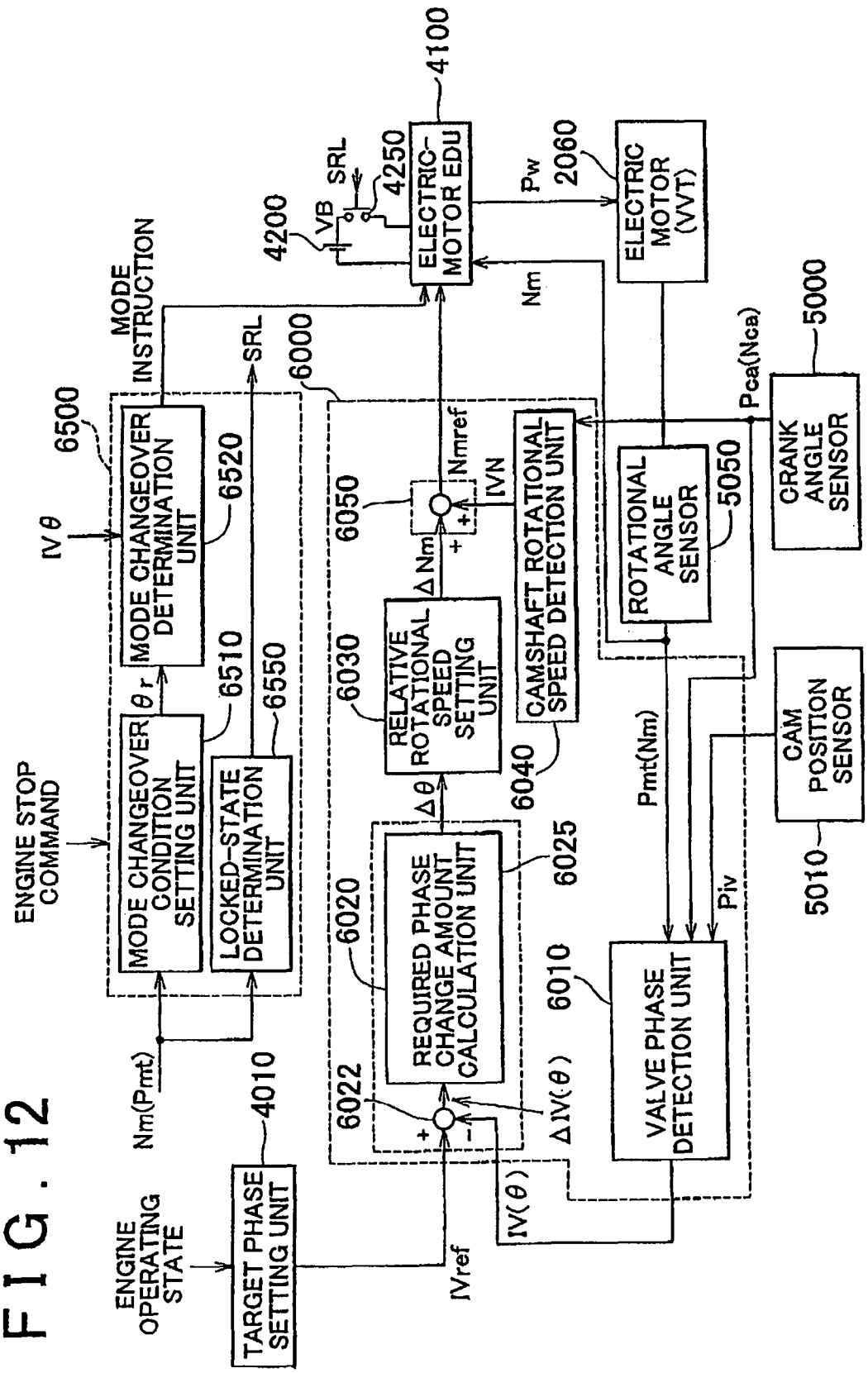
FIG. 12 is a block diagram illustrating the control over the rotational speed of an electric motor that serves as an actuator of the variable valve timing system according to the embodiment of the invention.

FIG. 12 is a block diagram illustrating the rotational speed control over the electric motor 2060 that serves as the actuator of the intake VVT mechanism 2000 according to the embodiment of the invention.

Figure 2:
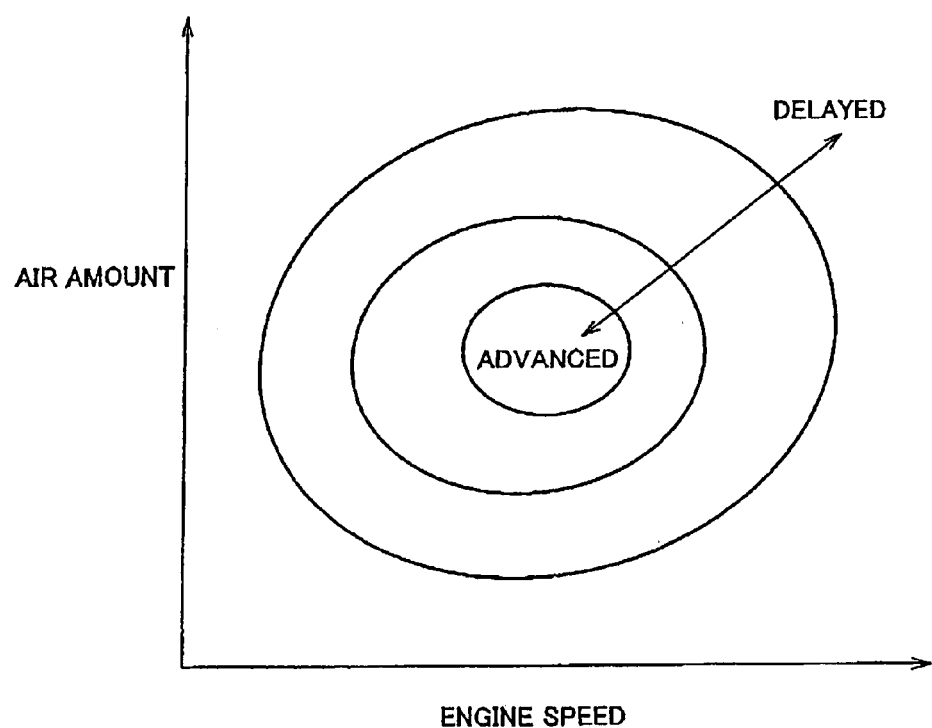
FIG. 2 is a graph showing the map that defines the phase of an intake camshaft.

As shown in FIG. 12, a target phase setting unit 4010 sets the target phase value IVref for the intake valve 1100 that is the target of the variable valve timing control based on parameters indicating the engine operating state (e.g. the engine speed and the intake air amount as shown in FIG. 2). By the time the engine 1000 is stopped, more specifically, after a command to stop the engine 1000 is issued, the target phase setting unit 4010 sets the target phase value IVref to the stop-time phase (the most delayed phase, in the embodiment)

appropriate for the engine starting to facilitate the subsequent engine starting. Namely, if the intake valve phase does not match the stop-time phase (if the stop-time phase has not been achieved) when the engine stop command is issued, the variable valve timing system needs to change the intake valve phase (namely, the phase of the intake camshaft 1120).

An actuator operation amount setting unit 6000 prepares the rotational speed command value Nmref for the electric motor 2060 based on the deviation of the current actual phase IV(θ) of the intake valve 1100 (hereinafter, referred to as the "actual intake valve phase IV(θ)") from the target phase value IVref such that the actuator is operated by the an amount at which the intake valve phase IV(θ) is caused to match the target phase value IVref.

The actuator operation amount setting unit 6000 includes a valve phase detection unit 6010; a camshaft phase change amount calculation unit 6020; a relative rotational speed setting unit 6030; a camshaft rotational speed detection unit 6040; and a rotational speed command value preparation unit 6050. The operation of the actuator operation amount setting unit 6000 is realized by executing the control routine according to a predetermined program stored in advance in the ECU 4000 in predetermined control cycles.

The valve phase detection unit 6010 calculates the actual phase IV(θ) of the intake valve 1100 (hereinafter, referred to as the "actual intake valve phase IV(θ)) based on the crank angle signal Pca from the crank angle sensor 5000, the cam angle signal Piv from the camshaft position sensor 5010, and the motor rotational angle signal Pmt from the rotational angle sensor 5050 for the electric motor 2060.

The camshaft phase change amount calculation unit 6020 includes a calculation unit 6022 and a required phase change amount calculation unit 6025. The calculation unit 6022 calculates the deviation ΔIV(θ) (ΔIV(θ)=IV(θ)−IVref) of the actual intake valve phase IV(θ) from the target phase IVref. The required phase change amount calculation unit 6025 calculates the amount Δθ by which the phase of the intake camshaft 1120 is required to change (hereinafter, referred to as the "required phase change amount Δθ for the intake camshaft 1120") in the current control cycle based on the calculated deviation ΔIV(θ).

For example, the maximum value Δθmax of the required phase change amount Δθ in a single control cycle is set in advance. The required phase change amount calculation unit 6025 sets the required phase change amount Δθ, which corresponds to the deviation ΔIV(θ) and which is equal to or smaller than the maximum value Δθmax. The maximum value Δθmax may be a fixed value. Alternatively, the maximum value Δθmax may be variably set by the required phase change amount calculation unit 6025 based on the operating state of the engine 1000 (the engine speed, the intake air amount, etc.) and the deviation ΔIV(θ). The camshaft phase change amount calculation unit 6020 determines whether the intake valve phase IV(θ) has reached the target phase value IVref. If it is determined that the intake valve phase IV(θ) has reached the target phase value IVref, the camshaft phase change amount calculation unit 6020 sets the phase change amount Δθ to zero (Δθ=0).

The relative rotational speed setting unit 6030 calculates the rotational speed ΔNm of the output shaft of the electric motor 2060 relative to the rotational speed of the sprocket 2010 (the intake camshaft 1120). The rotational speed ΔNm needs to be achieved in order to obtain the required phase change amount Δθ calculated by the required phase change amount calculation unit 6025. For example, the relative rotational speed ΔNm is set to a positive value (ΔNm>0) when the phase of the intake valve 1100 is advanced. On the other hand, when the phase of the intake valve 1100 is delayed, the relative rotational speed ΔNm is set to a negative value (ΔNm<0). When the current phase of the intake valve 1100 is maintained (namely, when the intake valve phase IV(θ) has reached the target phase value IVref (Δθ=0)), the relative rotational speed ΔNm is set to a value substantially equal to zero (ΔNm=0).

The relationship between the phase change amount Δθ per unit time ΔT corresponding to one control cycle and the relative rotational speed ΔNm is expressed by Equation 1 indicated below. In Equation 1, R(θ) is the speed reduction ratio that changes in accordance with the phase of the intake valve 1100, as shown in FIG. 9.

$$\Delta\theta \propto \Delta Nm \times 360° \times (1/R(\theta)) \times \Delta T \qquad \text{Equation 1}$$

According to Equation 1, the relative rotational speed setting unit 6030 calculates the rotational speed ΔNm of the electric motor 2060 relative to the rotational speed of the sprocket 2010, the relative rotational speed ΔNm being required to be achieved to obtain the phase change amount Δθ of the camshaft during the control cycle ΔT.

The camshaft rotational speed detection unit 6040 calculates the rotational speed of the sprocket 2010, namely, the actual rotational speed IVN of the intake camshaft 1120 by dividing the rotational speed of the crankshaft 1090 by two. Alternatively, the camshaft rotational speed detection unit 6040 may calculate the actual rotational speed IVN of the intake camshaft 1120 based on the cam angle signal Piv from the camshaft position sensor 5010.

The rotational speed command value preparation unit 6050 prepares the rotational speed command value Nmref for the electric motor 2060 by adding the actual rotational speed IVN of the intake camshaft 1120, which is calculated by the camshaft rotational speed detection unit 6040, to the relative rotational speed ΔNm set by the relative rotational speed setting unit 6030. A signal indicating rotational speed command value Nmref prepared by the rotational speed command value preparation unit 6050 is transmitted to the electric-motor EDU 4100.

The electric-motor EDU 4100 is connected to a power supply unit 4200 via a relay circuit 4250. The on/off state of the relay circuit 4250 is controlled based on the control signal SRL. The power supply unit 4200 is usually formed of a secondary battery that is charged during the operation of the engine 1000.

The electric-motor EDU 4100 executes the rotational speed control such that the rotational speed of the electric motor 2060 matches the rotational speed command value Nmref. For example, the electric-motor EDU 4100 controls the on/off state of a power semiconductor element (e.g. a transistor) to control the electric power supplied from the power supply unit 4200 to the electric motor 2060 (typically, the magnitude of electric current passing through the electric motor 2060 and the amplitude of the voltage applied to the electric motor 2060) based on the deviation (Nmref−Nm) of the actual rotational speed Nm of the electric motor 2060 from the rotational speed command value Nmref. For example, the duty ratio used in the on/off operation of the power semiconductor element is controlled.

The electric-motor EDU 4100 controls the duty ratio DTY that is an adjustment amount used in the rotational speed control according to Equation 2 indicated below, in order to control the electric motor 2060 more appropriately.

$$DTY = DTY(ST) + DTY(FB) \qquad \text{Equation 2}$$

In Equation 2, DTY(FB) is a feedback term based on the control calculation using the above-described deviation and a predetermined control gain (typically, common P control or PI control).

Figure 13:
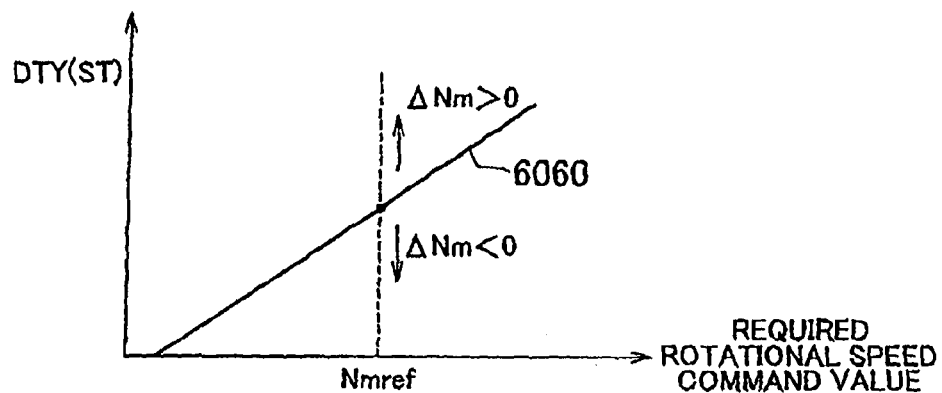
FIG. 13 is a graph illustrating the control over the rotational speed of the electric motor.

DTY(ST) in Equation 2 is a preset term that is set based on the rotational speed command value Nmref for the electric motor 2060 and the relative rotational speed ΔNm, as shown in FIG. 13.

As shown in FIG. 13, a duty ratio characteristic 6060 corresponding to the electric power required to be supplied to the electric motor 2060 (the electric current passed through the electric motor 2060, and the voltage applied to the electric motor 2060) when the relative rotational speed ΔNm is zero (ΔNm=0), namely, when the electric motor 2060 is rotated at the same rotational speed as the sprocket 2010 based on the rotational speed command value Nmref is presented in a table in advance. DTY(ST) in Equation 2 is set based on the duty ratio characteristic 6060. Alternatively, DTY(ST) in Equation 2 may be set by relatively increasing or decreasing the value of the duty ratio corresponding to the relative rotational speed ΔNm from the reference value based on the duty ratio characteristic 6060.

The rotational speed control, in which the electric power supplied to the electric motor 2060 is controlled using both the preset term and the feedback term in combination, is executed. In this way, the electric-motor EDU 4100 causes the rotational speed of the electric motor 2060 to match the rotational speed command value Nmref, even if it changes, more promptly than in a simple feedback control, namely, the rotational speed control in which the electric power supplied to the electric motor 2060 is controlled using only the feedback term DTY(FB) in Equation 2.

As shown in FIG. 12, the variable valve timing system according to the embodiment of the invention further includes a stop-time control mode setting unit 6500 that controls the intake valve phase after an engine stop command is issued. The stop-time control mode setting unit 6500 includes a mode changeover condition setting unit 6510, a mode changeover determination unit 6520, and a locked-state determination unit 6550.

The mode changeover determination unit 6520 sets the mode of the intake valve phase control after issuance of an engine stop command to the highest-speed mode (the first mode) in response to the issuance of the engine stop command, and maintains the highest-speed mode until the mode changeover condition set by the mode changeover condition setting unit 6510 is satisfied. The mode changeover determination unit 6520 changes the mode of the intake valve phase control from the highest-speed mode to the normal mode (the second mode) when the mode changeover condition is satisfied.

Figure 14:
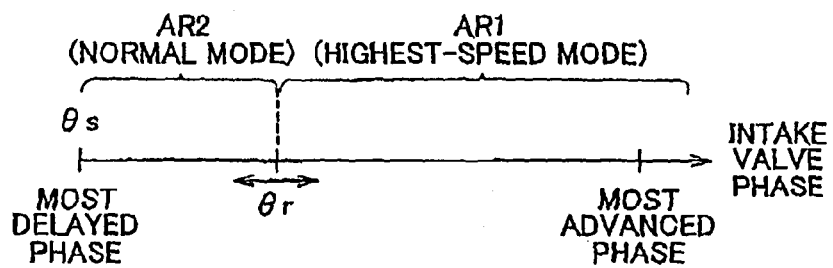
FIG. 14 is a graph illustrating the manner in which the mode is changed by a mode changeover determination unit.

For example, as shown in FIG. 14, after an engine stop command is issued, while the intake valve phase is within the region AR1 in which the intake valve phase is more advanced than the mode changeover phase θr at which the control mode is changed, the highest-speed mode is used. When the intake valve phase is within the region AR2 in which the intake valve phase matches the mode changeover phase θr or is more delayed than the mode changeover phase θr, the normal mode is used instead of the highest-speed mode. Namely, after the engine stop command is issued, the highest-speed mode is used until the phase difference Δθ between the most delayed phase that is the stop-time phase and the current intake valve phase becomes equal to or smaller than a predetermined value (|Δθ|≦|θr−θs|). Then, when the phase difference Δθ becomes equal to or smaller than the predetermined value, the control mode is changed from the highest-speed mode (the first mode) to the normal mode (the second mode). After that, the intake valve phase is changed toward the stop-time phase in the normal mode. When the intake valve phase is already within the region AR2 when an engine stop command is issued, the highest-speed mode is not selected, and the normal mode is continuously used as the control mode until the engine is stopped.

In the normal mode, the actuator operation amount setting unit 6000 executes the feedback control over the intake valve phase IV(θ), and the rotational speed of the electric motor 2060 is controlled based on the rotational speed command value Nmref.

In the highest-speed mode, the feedback control is not executed over the intake valve phase IV(θ). The amount of electric power supplied to the electric motor 2060 is fixed to the maximum value, and the electric motor 2060 is rotated against the normal rotational direction. Thus, the electric motor 2060 rotates against the normal rotational direction at the highest possible rotational speed under the current operating state, and therefore the intake valve phase is changed toward the most delayed phase (the stop-time phase) at the highest speed. In this case, the rotational speed of the electric motor 2060 varies depending on the conditions such as the temperature. Especially, when the temperature is low, the load torque of the electric motor 2060 increases due to an increase in the viscosity of the lubricating oil. Accordingly, the rotational speed of the electric motor 2060, which is achieved by the same amount of received electric power, becomes lower than when the temperature is not low.

The mode changeover condition setting unit 6510 sets the mode changeover phase θr that indicates the mode changeover condition upon reception of the motor rotational angle signal Pmt that is a pulse signal having a frequency corresponding to the rotational speed Nm of the electric motor 2060.

Figure 15:
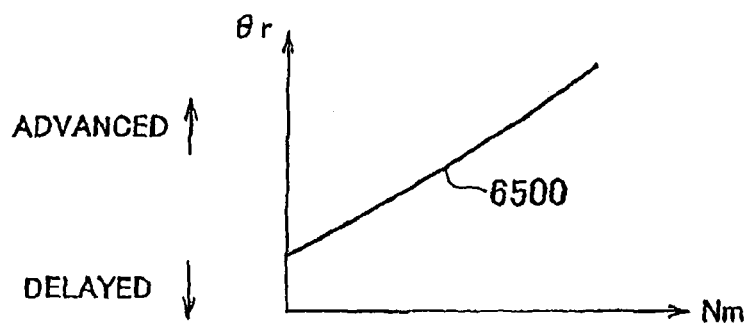
FIG. 15 is a graph illustrating the manner in which the mode changeover phase is variably set.

As shown in FIG. 15, the mode changeover phase θr is successively set in accordance with the current motor speed Nm. As the motor speed Nm increases, the mode changeover phase θr is more advanced. Namely, the mode changeover condition is set such that, as the motor speed Nm increases, the timing at which the mode is changed from the highest-speed mode to the normal mode becomes earlier.

Alternatively, the time that has elapsed since an engine stop command is issued may be measured by a timer (not shown), and the mode changeover condition may be set based on a result of comparison between the elapsed time T and the mode changeover time Tm. In this case, the mode changeover determination unit 6250 uses the highest-speed mode until the elapsed time T reaches the mode changeover time Tm. When the mode changeover time Tm has elapsed since the engine stop command is issued, the mode changeover determination unit 65 may change the control mode from the highest-speed mode to the normal mode, and maintain the normal mode thereafter.

Figure 16:
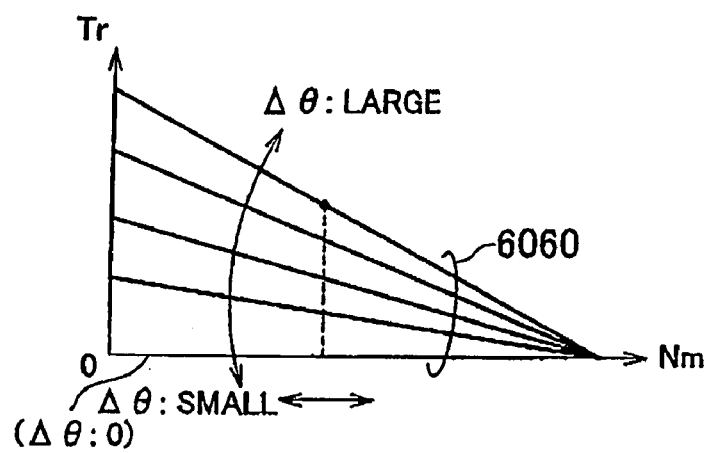
FIG. 16 is a graph illustrating the manner in which the mode changeover time is variably set.

The mode changeover condition setting unit 6510 sets the mode changeover time Tm based on the phase difference Δθ and the rotational speed Nm of the electric motor 2060 when an engine stop command is issued. For example, as shown in FIG. 16, a setting characteristic 6600 that indicates the relationship between the motor speed Nm and the mode changeover time Tm is set in advance for each phase difference Δθ when an engine stop command is issued. The mode changeover condition setting unit 6510 selects the setting characteristic 6600 that will be used, based on the phase difference Δθ when the engine stop command is issued, and then successively calculates the mode-changeover time Tm corresponding to the current motor speed Nm according to the selected setting characteristic 6600. The mode changeover time Tm is set to a shorter time as the phase difference Δθ when the engine stop command is issued is smaller, and set to a shorter time as the motor speed Nm is higher.

Figure 17:
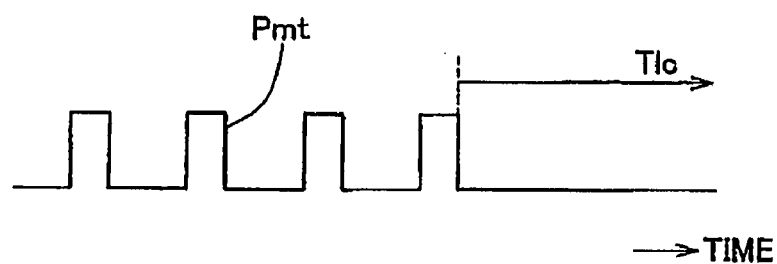
FIG. 17 is a waveform chart illustrating the manner in which whether the electric motor is in the locked state (i.e., the state in which the rotation of the electric motor is stopped substantially completely) is determined based on a signal output from a motor rotational angle sensor.

As shown in FIG. 12, the locked-state determination unit 6550 determines whether the electric motor 2060 is in the locked state in which the rotation of the electric motor 2060 is stopped substantially completely. More specifically, as shown in FIG. 17, when the pulse non-generation duration, during which the motor rotational angle signal Pmt does not generate pulses, exceeds a limit value, it is determined that the electric motor 2060 is in the locked-state. Alternatively, the pulse non-generation duration T1c may be accumulated after the engine stop command is issued, and it may be determined that the electric motor 2060 is in the locked state when the accumulated duration reaches a predetermined value.

The locked-state determination unit 6550 produces the control signal SRL for turning off the relay circuit 4250 or a stop signal for stopping the on/off control executed by the electric-motor EDU 4100, thereby stopping a supply of electric power to the electric motor 2060. Thus, it is possible to prevent the electric motor 2060 and a switching element arranged within the electric-motor EDU 4100 that controls the electric motor 2060 from malfunctioning due to overheating.

Next, the configuration of the electric-motor EDU 4100 that controls the electric motor 2060 will be described with reference to FIG. 18.

Figure 18:
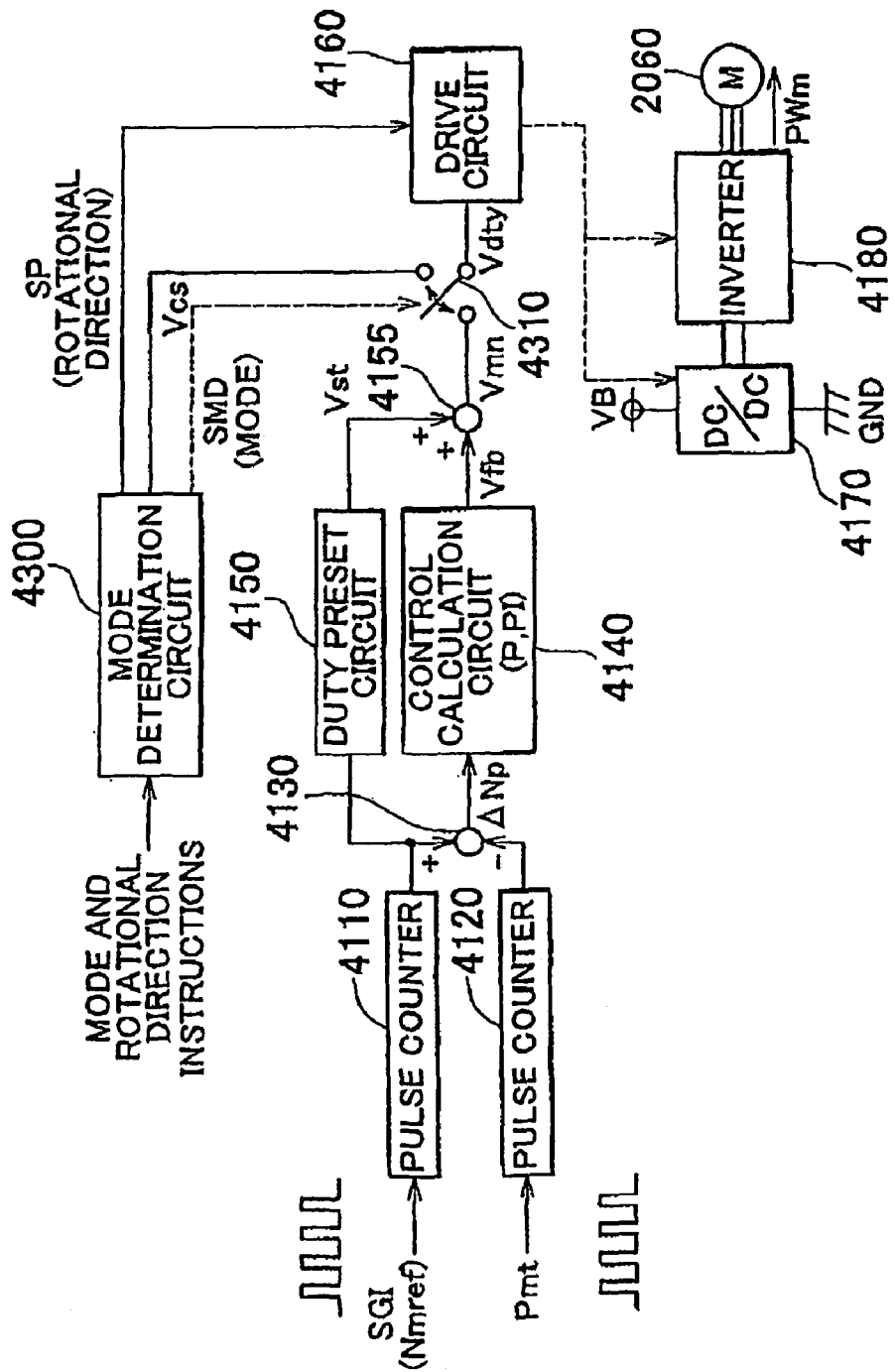
FIG. 18 is a functional block diagram illustrating the configuration of an electric-motor EDU.

FIG. 18 is a functional block diagram illustrating the concrete configuration of the electric-motor EDU 4100. As shown in FIG. 18, the electric-motor EDU 4100 includes pulse counters 4110 and 4120, a subtraction circuit 4130, a control calculation circuit 4140, a duty preset circuit 4150, an addition circuit 4155, a drive circuit 4160, a DC/DC converter 4170, an inverter 4180, a mode determination circuit 4300, and a changeover switch 4310.

The electric-motor EDU 4100 receives the control signal SG1 that is a pulse signal having a frequency corresponding to the rotational speed command value Nmref from the ECU 4000. The pulse counter 4110 counts the number of pulses of the pulse signal SG1 from the ECU 4000. The pulse signal SG1 has a frequency corresponding to the rotational speed command value Nmref. The pulse counter 4120 counts the number of pulses of the motor rotational angle signal Pmt. The subtraction circuit 4130 outputs a signal indicating the difference ΔNp between the number of pulses counted by the pulse counter 4110 and the number of pulses counted by the pulse counter 4120. Namely, the signal output from the subtraction circuit 4130 indicates the difference ΔNp corresponding to the deviation of the rotational speed of the electric motor 2060 from the rotational speed command value Nmref.

The control calculation circuit 4140 outputs a signal indicating the adjustment amount based on the deviation of the rotational speed of the electric motor 2060 from the rotational speed command value Nmref, namely, the control voltage Vfb that indicates the feedback term DTY(FB) in Equation 2 according to a known control calculation method, for example, P control or PI control. The duty preset circuit 4150 outputs a signal indicating the control voltage Vst that indicates the preset term DTY (ST) in Equation 2 based on the duty ratio characteristic 6060 shown in FIG. 13, according to the signal output from the pulse counter 4110.

The addition circuit 4155 outputs a signal indicating the control voltage Vmn that is the sum of the control voltage Vfb indicated by the signal from the control calculation circuit 4140 and the control voltage Vst indicated by the signal from the duty preset circuit 4150. The control voltage Vmn corresponds to the voltage indicating the duty ratio DTY in Equation 2. The control voltage Vmn indicates the duty ratio of the power semiconductor element arranged within the DC/DC converter 4170, which is used in the rotational speed control mode.

The mode determination circuit 4300 prepares the control signal SP indicating whether the electric motor 2060 is rotating in the normal rotational direction or against the normal rotational direction, and the control signal SMD indicating the selected control mode, according to an instruction from the ECU 4000. After an engine stop command is issued, the mode determination circuit 4300 prepares the control signal SMD based on the mode selected by the mode changeover determination unit 6520 shown in FIG. 12. During the normal operation, the control signal SMD is set such that the normal mode is basically selected.

The rotational direction of the electric motor 2060 is set basically based on the rotational speed command value Nmref. Alternatively, the rotational direction of the electric motor 2060 may be set according to a direct signal from the ECU 4000. Especially, in the highest-speed mode after an engine stop command is issued, the rotational direction of the electric motor 2060 needs to be set based on whether the current intake valve phase is more advanced or more delayed than the stop-time phase. However, according to the embodiment of the invention, because the stop-time phase of the intake valve 1100 matches the most delayed phase, the rotational direction of the electric motor 2060 is constant (against the normal rotational direction) after an engine stop command is issued.

When the normal mode is selected, the changeover switch 4310 transmits a signal indicating the control voltage Vmn indicated by a signal from the addition circuit 4155 to the drive circuit 4160, as a signal indicating the control voltage Vdty, according to the control signal SMD from the mode determination circuit 4300. On the other hand, when the highest-speed mode is selected, the changeover switch 4310 transmits a signal indicating the voltage Vcs corresponding to the maximum duty ratio DTYmax (100%) to the drive circuit 4160, as a signal indicating the control voltage Vdty.

The DC/DC converter 4170 is formed of, for example, a chopper circuit. The source voltage VB from the power supply unit 4200 is stepped up or stepped down in accordance with the duty ratio of the power semiconductor element in the circuit. Accordingly, the output voltage Vac from the DC/DC converter 4170 is variably controlled in accordance with the duty ratio DTY instructed by the control voltage Vdty.

The inverter 4180 is formed of, for example, a common three-phase inverter, and applies an alternating-current voltage of which the peak amplitude matches the output voltage Vac from the DC/DC converter 4170 to the electric motor 2060. Accordingly, in the highest-speed mode, the output voltage Vac from the DC/DC converter 4170 exhibits the maximum value based on the maximum duty ratio DTYmax. Therefore, the amplitude of the voltage applied to the electric motor 2060 is the maximum value, and the amount of electric power supplied to the electric motor 2060 is also set to the maximum value. Thus, the motor speed is set to a highest possible value in the current operating state by executing a simple control.

When the electric motor 2060 is rotating against the normal rotational direction, the inverter 4180 applies an alternating-current voltage, of which the phase is inverted from that when the electric motor 2060 is rotating in the normal rotational direction, to the electric motor 2060 according to the control signal SP from the mode determination circuit 4300.

FIG. 19 is a flowchart illustrating the manner in which the control mode after the engine stop command is issued is set in the variable valve timing system according to the embodiment of the invention. The control routine shown in FIG. 19 is realized by executing a program stored in advance in the ECU 4000 in predetermined control cycles.

As shown in FIG. 19, the ECU 4000 determines in step S100 whether an engine stop command has been issued. For example, the determination in step S100 may be made based on the engine-stop processing flag that is set to "OFF" when the engine is started and that is set to "ON" in response to an issuance of an engine stop command.

When a negative determination is made in step S100, namely, when it is determined that an engine stop command has not been issued, the ECU 4000 sets the control mode for the intake valve phase to the normal mode. As described above, in the normal mode, the rotational speed control is executed over the electric motor 2060 by executing the feedback control to bring the intake valve phase to the target phase value.

On the other hand, when an affirmative determination is made in step S100, the ECU 4000 determines whether the engine speed is within a predetermined speed range. A negative determination is made in step S105, when the engine is rotating at a considerably low speed (for example, an engine speed lower than 200 rpm), namely, when the time until the engine is stopped is too short to change the intake valve phase by a sufficient amount, or when the engine is rotating at a high speed (for example, an engine speed over 2000 rpm), namely, when a sufficient time to change the intake valve phase is left and it is therefore estimated that the intake valve phase can be changed to the stop-time phase by executing the control in the normal mode without selecting the highest-speed mode. In the cases other than the case where the engine is rotating at a considerably low speed and the case where the engine is rotating at a high speed (for example, in the case where the engine is rotating at an engine speed from 200 rpm to 2000 rpm), an affirmative determination is made in step S105.

When an affirmative determination is made in step S105, the ECU 4000 determines in step S110 whether the control mode has already been set to the normal mode under the conditions described below after the engine stop command is issued. If it is determined that the control mode has already been set to the normal mode ("YES" in step S110), the ECU 4000 executes step S150 to maintain the control mode for the intake valve phase at the normal mode. As described above, the target phase value IV($\theta$) in the normal mode is set to the stop-time phase $\theta$s (the most delayed phase) after the engine stop command is issued.

On the other hand, when a negative determination is made in step S110, namely, when the highest-speed mode that is initially set when the engine stop command is issued is maintained, the ECU 4000 sets in step S120 the mode changeover condition, more specifically, the mode changeover phase $\theta$r shown in FIGS. 14 and 15 (or the mode changeover time Tm shown in FIG. 16) based on the current motor speed Nm.

Then, the ECU 4000 determines in step S130 whether the mode changeover condition set in step S120 has been satisfied. When the mode changeover phase $\theta$r is selected as the mode changeover condition, the ECU 4000 determines whether the current intake valve phase IV($\theta$) is closer to the stop-time phase $\theta$s than the mode changeover phase $\theta$r is. Namely, it is determined whether the following equation is satisfied; |IV($\theta$)–$\theta$s|<|$\theta$r–$\theta$s|. When the stop-time phase matches the most delayed phase, the ECU 4000 determines in step S130 whether the current intake valve phase IV($\theta$) is more delayed than the mode changeover phase $\theta$r set in step S130 (IV($\theta$)<$\theta$r).

When the mode changeover time Tm is selected as the mode changeover condition, a negative determination is made in step S130 until the time that has elapsed since the engine stop command is issued and that is measured by the timer (not shown) reaches the mode changeover time Tm. After the elapsed time exceeds the mode changeover time Tm, an affirmative determination is made in step S130. The process in step S120 corresponds to the operation executed by the mode changeover condition setting unit 6510 shown in FIG. 12.

When it is determined that the mode changeover condition is satisfied ("YES" in step S130), namely, when it is determined that the current intake valve phase IV($\theta$) is closer to the stop-time phase $\theta$s than the mode changeover phase $\theta$r is, or when the time that has elapsed since the engine stop command is issued exceeds the mode changeover time Tm, the ECU 4000 executes step S150 to set the control mode for the intake valve phase to the normal mode.

On the other hand, when it is determined that the mode changeover condition is not satisfied ("NO" in step S130), namely, when it is determined that the current intake valve phase IV(O) is farther from the stop-time phase $\theta$s than the mode changeover phase $\theta$r is, or when the time that has elapsed since the engine stop command is issued has not reached the mode changeover time Tm, the ECU 4000 executes step S160 to determine whether the electric motor 2060 is in the locked-state in which the rotation of the electric motor 2060 is stopped substantially completely. Because the determination in step S160 is made in the same manner as the above-described manner in which the locked-state determination unit 6550 determines whether the electric motor 2060 is in the locked-state, the detailed description will not be provided below.

When it is determined that the electric motor 2060 is in the locked-state ("YES" in step S160), the ECU 4000 stops the electric power supply to the electric motor 2060 in step S200, and ends the intake valve phase control in step S210. Namely, the processes in steps S160, S200 and S210 correspond to the operation performed by the locked-state determination unit 6550 shown in FIG. 12. The control for determining whether the electric motor 2060 is in the locked-state is executed during the normal control (the normal mode) as well. However, in the highest-speed mode in which a large amount of electric power is supplied to the electric motor 2060, the limit value used to determine whether the electric motor 2060 is in the locked-state is set to a value shorter than that used in the normal mode.

When the electric motor 2060 is not in the locked-state, the ECU 4000 sets the control mode for the intake valve phase to the highest-speed mode in step S180. The processes in steps S130, S150 and S180 correspond to the operation performed by the mode changeover determination unit 6520 shown in FIG. 12.

According to the control routine described above, after the engine stop command is issued, whether the engine speed is within the predetermined speed range is determined (S105), and whether the mode changeover condition is satisfied is determined (S130). When the engine speed is within the predetermined speed range in which the highest-speed mode should be selected, and the mode changeover condition is not satisfied, that is, the intake valve phase is farther from the stop-time phase than the mode changeover phase is, the control mode for the intake valve phase is set to the highest-speed mode. Until the mode changeover condition is satisfied, the control mode for the intake valve phase is maintained at the highest-speed mode. During this period, the electric motor 2060 is rotated at the highest speed, and therefore the intake valve phase is caused to approach the stop-time phase at a high speed. As a result, the intake valve phase is reliably changed by a required amount after the engine stop command is issued.

In addition, when the intake valve phase comes close to the stop-time phase and the mode changeover condition is satisfied, the control mode for the intake valve phase is changed from the highest-speed mode to the normal mode. Thus, the intake valve phase is set to the stop-time phase with higher accuracy. Especially, when the stop-time phase is the limit value of the phase changeable range, for example, the most delayed phase, devices are prevented from malfunctioning due to a high-speed collision of a movable part of the VVT mechanism 2000 with a stopper portion, because the intake valve phase is not changed at a high speed after the control mode is changed to the normal mode.

In addition, according to the embodiment of the invention, the mode changeover condition is variably set such that, as the motor speed is higher, the control mode is changed to the normal mode at an earlier timing, that is, when the phase difference between the current valve timing and the target valve timing is larger. Accordingly, the mode changeover condition is appropriately set in accordance with the motor speed. Namely, the intake valve phase is more reliably changed by a required amount, and the intake valve phase is set to the stop-time phase more accurately with the control configuration according to the embodiment of the invention than with the control configuration in which the mode changeover condition is fixed.

In addition, in the highest-speed mode in which a large amount of electric power is supplied to the electric motor 2060, the control to stop the electric power supply to the electric motor 2060 in response to the determination that the electric motor 2060 is in the locked-state is executed in the manner different from that in the normal mode. Accordingly, the electric motor 2060 is prevented from overheating due to being in the locked-state. As a result, the devices are protected from malfunctioning.

In the embodiment of the invention described above, the VVT mechanism 2000 (FIGS. 3 to 9) may be regarded as a "changing mechanism" according to the invention, and the stop-time control mode setting unit 6500 and steps S105 to S210 may be regarded as a "stop-time phase control unit" according to the invention. The mode changeover condition setting unit 6510 and step S120 may be regarded as a "mode changeover condition setting unit" according to the invention. The mode changeover determination unit 6520 and steps S130, S150 and S180 may be regarded as a "mode changeover determination unit" according to the invention. The locked-state determination unit 6550 and steps S160, S200 and S210 may be regarded as a "locked-state determination unit" according to the invention. The electric-motor EDU 4100 may be regarded as a "drive control unit" according to the invention.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

The invention claimed is:

1. A variable valve timing system that changes opening/closing timing of at least one of an intake valve and an exhaust valve provided in an engine, comprising:
    a changing mechanism that is structured to change the opening/closing timing by changing a rotational phase difference between a camshaft that drives the valve of which the opening closing timing is changed and a crankshaft in a direction, which is determined based on whether a rotational speed of an electric motor, used as an actuator, relative to a rotational speed of the camshaft takes a positive value or a negative value, and at a rate that is determined based on a degree of the rotational speed of the electric motor relative to the rotational speed of the camshaft, when the engine is operating; and
    a stop-time phase control unit that sets a control mode for the opening/closing timing after a command to stop the engine is issued, wherein
    the stop-time phase control unit includes a mode changeover condition setting unit that sets a mode changeover condition based on a rotational speed of the electric motor, and a mode changeover determination unit that determines whether the mode changeover condition is satisfied based on a status of control over the opening/closing timing, and
    the mode changeover determination unit sets the control mode to a first mode in which the electric motor is rotated at a highest possible speed in a current operating state and in a direction in which the opening/closing timing is changed toward a target opening/closing timing that should be achieved when the engine is stopped after the command to stop the engine is issued until the mode changeover condition is satisfied, and the mode changeover determination unit sets the control mode to a second mode in which a feedback control for setting a rotational speed command for the electric motor based on a deviation of the current opening/closing timing from the target opening/closing timing is executed after the mode changeover condition is satisfied.

2. The variable valve timing system according to claim 1, wherein
    the mode changeover determination unit determines that the mode changeover condition is satisfied when the deviation of the current opening/closing timing from the target opening/closing timing when the engine is stopped is equal to or smaller than a predetermined amount that is variably set based on a current rotational speed of the electric motor, and
    the predetermined amount is set to a larger value as the rotational speed of the electric motor becomes higher.

3. The variable valve timing system according to claim 1, wherein
    the mode changeover determination unit determines that the mode changeover condition is satisfied when time that has elapsed since the first mode is started is equal to or longer than a predetermined time, and
    the predetermined time is set based on the deviation of the current opening/closing timing, when the command to stop the engine is issued, from the target opening/closing timing and the current rotational speed of the electric motor such that the predetermined time is set to a shorter value as the rotational speed of the electric motor becomes higher and the deviation of the opening/closing timing, when the command to stop the engine is issued, from the target opening/closing timing becomes smaller.

4. The variable valve timing system according to claim 1, further comprising:
a locked-state determination unit that determines whether the electric motor is in a locked state in which rotation of the electric motor is stopped substantially completely, based on the rotational speed of the electric motor, wherein
the locked-state determination unit commands to stop an electric power supply to the electric motor when a duration during which the electric motor is in the locked-state exceeds a predetermined duration after the command to stop the engine is issued.

5. The variable valve timing system according to claim 1, further comprising:
a drive control unit that controls an amount of electric power supplied to the electric motor according to a control command concerning the opening/closing timing, wherein
the drive control unit fixes the amount of electric power supplied to the electric motor to a maximum value when in the first mode, and the drive control unit variably controls the amount of electric power supplied to the electric motor based on the current rotational speed of the electric motor and the rotational speed command when in the second mode.

6. The variable valve timing system according to claim 1, wherein
the changing mechanism sets a ratio of an amount of change in the opening/closing timing with respect to an operation amount of the actuator to a lower value when the opening/closing timing is within a first phase region than when the opening/closing timing is within a second phase region, and
the target opening/closing timing when the engine is stopped is set within the first phase region, and the target opening/closing timing when the engine is idling is set within the second phase region.

7. The variable valve timing system according to claim 1, wherein the target opening/closing timing when the engine is stopped is the opening/closing timing at the most delayed phase.

8. The variable valve timing system according to claim 1, wherein
the electric motor is rotated against a normal rotational direction of the electric motor after the command to stop the engine is issued such that the opening/closing timing is changed toward the opening/closing timing at the most delayed phase.

9. A method for controlling a variable valve timing system that changes opening/closing timing of at least one of an intake valve and an exhaust valve provided in an engine, and that includes a changing mechanism that is structured to change the opening/closing timing by changing a rotational phase difference between a camshaft that drives the valve of which the opening closing timing is changed and a crankshaft in a direction, which is determined based on whether a rotational speed of an electric motor, used as an actuator, relative to a rotational speed of the camshaft takes a positive value or a negative value, and at a rate that is determined based on a degree of the rotational speed of the electric motor relative to the rotational speed of the camshaft, when the engine is operating, comprising:
setting a mode changeover condition based on a rotational speed of the electric motor;
determining whether the mode changeover condition is satisfied based on a status of control over the opening/closing timing; and
setting a control mode to a first mode in which the electric motor is rotated at a highest possible speed in a current operating state and in a direction in which the opening/closing timing is changed toward a target opening/closing timing that should be achieved when the engine is stopped after the command to stop the engine is issued until the mode changeover condition is satisfied, and setting the control mode to a second mode in which a feedback control for setting a rotational speed command for the electric motor based on a deviation of the current opening/closing timing from the target opening/closing timing is executed after the mode changeover condition is satisfied.

10. The method according to claim 9, wherein
it is determined that the mode changeover condition is satisfied when the deviation of the current opening/closing timing from the target opening/closing timing when the engine is stopped is equal to or smaller than a predetermined amount that is variably set based on a current rotational speed of the electric motor, and
the predetermined amount is set to a larger value as the rotational speed of the electric motor becomes higher.

11. The method according to claim 9, wherein
it is determined that the mode changeover condition is satisfied when time that has elapsed since the first mode is started is equal to or longer than a predetermined time, and
the predetermined time is set based on the deviation of the current opening/closing timing, when the command to stop the engine is issued, from the target opening/closing timing and the current rotational speed of the electric motor such that the predetermined time is set to a shorter value as the rotational speed of the electric motor becomes higher and the deviation of the opening/closing timing, when the command to stop the engine is issued, from the target opening/closing timing becomes smaller.

12. The method according to claim 9, further comprising:
determining whether the electric motor is in a locked state in which rotation of the electric motor is stopped substantially completely, based on the rotational speed of the electric motor, wherein
a command to stop an electric power supply to the electric motor is issued when a duration during which the electric motor is in the locked-state exceeds a predetermined duration after the command to stop the engine is issued.

13. The method according to claim 9, further comprising:
controlling an amount of electric power supplied to the electric motor according to a control command concerning the opening/closing timing, wherein
the amount of electric power supplied to the electric motor is fixed to a maximum value when in the first mode, and the amount of electric power supplied to the, electric motor is variably controlled based on the current rotational speed of the electric motor and the rotational speed command when in the second mode.

14. The method according to claim 9, wherein
the changing mechanism sets a ratio of an amount of change in the opening/closing timing with respect to an operation amount of the actuator to a lower value when the opening/closing timing is within a first phase region than when the opening/closing timing is within a second phase region, and the target opening/closing timing when the engine is stopped is set within the first phase region, and the target opening/closing timing when the engine is idling is set within the second phase region.

15. The method according to claim 9, wherein
the target opening/closing timing when the engine is stopped is the opening/closing timing at the most delayed phase.

16. The method according to claim 9, wherein
the electric motor is rotated against a normal rotational direction of the electric motor after the command to stop the engine is issued such that the opening/closing timing is changed toward the opening/closing timing at the most delayed phase.

* * * * *